United States Patent

Kim et al.

[11] Patent Number: 5,935,291
[45] Date of Patent: Aug. 10, 1999

[54] BUSHINGS AND FIBER FORMING ASSEMBLIES

[75] Inventors: Kwan Young Kim, Greensboro, N.C.; James W. Koewing, Murrysville; Robert A. Roach, Allison Park, both of Pa.

[73] Assignee: PPG Industries Ohio, Inc., Cleveland, Ohio

[21] Appl. No.: 08/959,996

[22] Filed: Oct. 29, 1997

[51] Int. Cl.[6] .................................................. C03B 37/085
[52] U.S. Cl. .......................... 65/495; 65/499; 65/134.1; 65/135.1; 65/135.2; 65/178; 65/179; 65/180; 425/72.2; 425/192.5; 425/378.2; 425/382.2
[58] Field of Search .......................... 65/495, 499, 134.1, 65/135.1, 135.2, 178, 179, 180; 425/72.2, 192 S, 378.2, 382.2

[56] References Cited

U.S. PATENT DOCUMENTS

| | | | |
|---|---|---|---|
| 2,898,628 | 8/1959 | Phipps . | |
| 3,628,930 | 12/1971 | Harris | 65/495 |
| 3,810,741 | 5/1974 | Stalego | 65/499 |
| 3,837,823 | 9/1974 | Shealy | 65/1 |
| 3,985,530 | 10/1976 | Hynd | 65/1 |
| 3,988,135 | 10/1976 | Coggin, Jr. | 65/1 |
| 4,023,950 | 5/1977 | Glaser | 65/29 |
| 4,046,535 | 9/1977 | Stalego | 65/495 |
| 4,104,015 | 8/1978 | Meyer . | |
| 4,436,541 | 3/1984 | Pellegrin et al. | 65/2 |
| 4,488,891 | 12/1984 | Grubka et al. | 65/2 |
| 4,612,027 | 9/1986 | Marra | 65/1 |
| 4,664,688 | 5/1987 | Grubka et al. | 65/1 |
| 5,147,431 | 9/1992 | Gaertner | 65/1 |

FOREIGN PATENT DOCUMENTS

| | | | |
|---|---|---|---|
| 632507 | 12/1961 | Canada | 65/495 |
| 562518 | 8/1977 | U.S.S.R. | C03B 37/02 |
| 574405 | 10/1977 | U.S.S.R. | C03B 37/02 |
| 610808 | 5/1978 | U.S.S.R. | C03B 37/02 |
| 759468 | 8/1980 | U.S.S.R. | C03B 37/025 |
| 842067 | 6/1981 | U.S.S.R. | C03B 37/09 |
| 897721 | 1/1982 | U.S.S.R. | C03B 37/09 |
| 966050 | 10/1982 | U.S.S.R. | C03B 37/09 |
| 998399 | 2/1983 | U.S.S.R. | C03B 37/09 |
| 1004280 | 3/1983 | U.S.S.R. | C03B 37/09 |
| 1020386 | 5/1983 | U.S.S.R. | C03B 37/09 |
| 1087480 | 4/1984 | U.S.S.R. | C03B 37/09 |
| 1167160 | 7/1985 | U.S.S.R. | C03B 37/09 |
| 1201243 | 12/1985 | U.S.S.R. | C03B 37/06 |
| 1710528 | 2/1992 | U.S.S.R. | C03B 37/09 |
| WO98/39260 | 9/1998 | WIPO . | |

OTHER PUBLICATIONS

K. L. Lowenstein, The Manufacturing Technology of Continuous Glass Fibres, 3rd ed., 1993, pp. 30–36, 85–101, 118–148, 186–194, 237–287.
G. Gan et al., "Pressure Loss Characteristics of Orifice and Perforated Plates." Experimental Thermal and Fluid Science (1997) vol. 14, pp. 160–165.
W. Hughes et al., Schaum's Outline of Theory and Problems of Fluid Dynamics, (1967), pp. 63, 75–105.
Encyclopedia of Polymer Science and Technology, (1967), pp. 506–507.

Primary Examiner—Peter Chin
Assistant Examiner—Michael P. Colaianni
Attorney, Agent, or Firm—Ann Marie Cannoni; Andrew C. Siminerio

[57] ABSTRACT

A bushing including a tip plate having an orifice region including orifices to permit flow of a molten fiberizable material therethrough; a reservoir for supplying molten fiberizable material to the orifices; and a substantially planar perforated plate positioned within the reservoir generally parallel to and substantially coextensive with the orifice region of the tip plate, the perforated plate including a central region and a peripheral region surrounding the central region, each of the central region and the peripheral region of the perforated plate having a plurality of openings to permit flow of molten fiberizable material therethrough, wherein average head loss of molten material flowing through the central region of the perforated plate is greater than average head loss of molten material flowing through the peripheral region of the perforated plate.

24 Claims, 16 Drawing Sheets

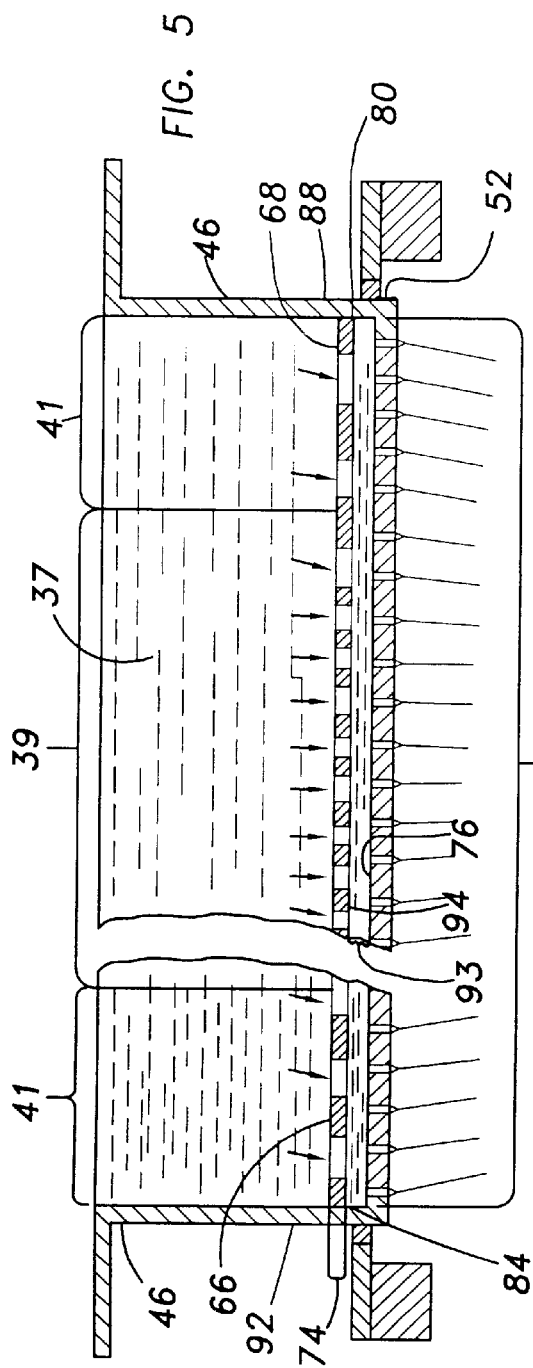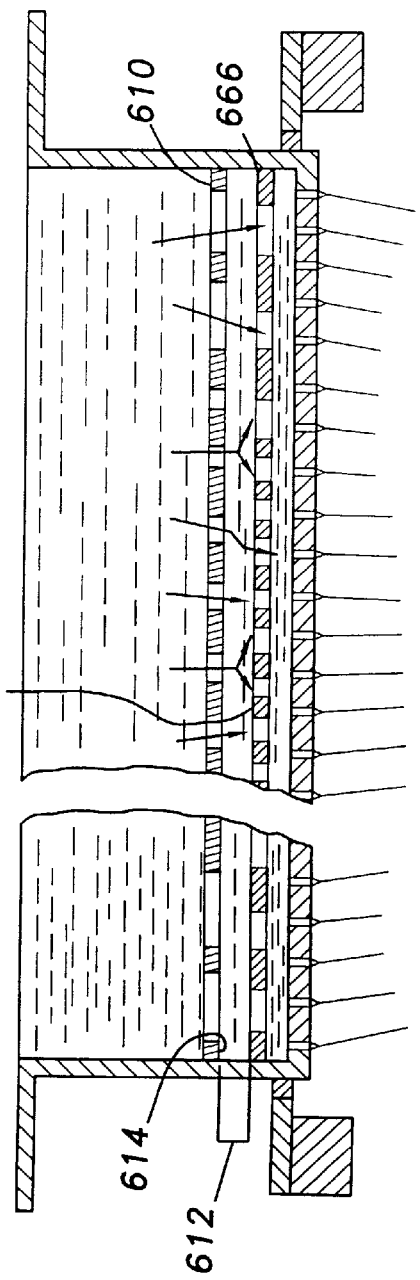

BUSHINGS AND FIBER FORMING ASSEMBLIES

FIELD OF THE INVENTION

The present invention relates to bushings, fiber forming assemblies and methods for forming fibers and, more particularly, to bushings including one or more perforated plates located in the center of the bushing reservoir above the tip plate which provide flow resistance to increase the flow of molten fiberizable material to the periphery of the reservoir to reduce temperature variation within the molten material.

BACKGROUND OF THE INVENTION

In a typical direct melt forming operation, glass batch materials are heated in a large melting furnace and fed via a refiner to an elongated refractory-lined forehearth having a plurality of bushing assemblies connected to apertures in the bottom of the forehearth. Glass fibers are formed by attenuating streams of molten glass through orifices or nozzles in the bottom tip plate of each bushing assembly.

In conventional bushings, the flow pattern through the bushing is generally determined by the configuration, number and positioning of the orifices. The bushing throughput can be affected by fluctuations in the temperature of the bushing tip plate and molten glass contained in the bushing reservoir. To control bushing throughput, U.S. Pat. No. 4,436,541 discloses a method and apparatus for forming mineral fibers in which an orificed member is positioned above the bushing tip plate and extends between the sidewalls of the bushing (col. 1, lines 38–45). In an example at col. 2, lines 60–62, the orificed member has uniformly distributed 0.039 inch diameter orifices on 0.25 inch centers. The ratio of resistance to flow of the orificed member to the resistance to flow of the tip plate ranges from about 0.5 to about 1 (col. 1, lines 45–48).

U.S. Pat. No. 4,612,027 discloses a method and apparatus for forming glass fibers from a bushing having fields of "dripless" and "non-dripless" orifices, the "dripless" fields being positioned at the ends and corners of the bushing which are generally more prone to filament breaks (col. 3, lines 39–60). A pressure control plate is positioned within the bushing and has an outer region of high flow resistance to reduce the pressure at the orifices of the dripless fields and a central region of low flow resistance to maintain sufficient pressure at the orifices of the non-dripless fields to provide non-dripless operation (col. 3, line 67–col. 4, line 4). The dripless and non-dripless fields are isolated from each other by partitions extending between the pressure control plate and the tip plate (col. 4, lines 11–15).

U.S. Pat. No. 4,664,688 discloses a bushing including a pressure control plate having openings in its center and mechanical valves at opposed ends of the plate near the end walls of the bushing to permit variable control of the pressure of molten glass at the orifices of the tip plate (col. 3, lines 53–57). The flow resistance provided by the pressure control plate is increased when the valves are closed to render the bushing dripless during fiber forming. To facilitate restart of the fiber forming operation after fiber breakage, the valves are opened to decrease the flow resistance provided by the pressure control plate (col. 4., lines 6–16).

U.S. Pat. No. 3,988,135 discloses a bushing which includes a perforated reinforcing plate attached to the tip plate and a perforated deflector plate attached to the side walls of the bushing. The orifices of the reinforcing plate permit molten glass to pass through the reinforcing plate at a rate at least as great as the rate at which it passes through the orifices of the tip. plate (col. 4, lines 59–62). The deflector plate has a peaked construction to laterally deflect molten glass towards collection areas near the end walls of the bushing (col. 6, lines 24–29).

Russian Patent No. 562518 discloses a bushing assembly having a solid longitudinal divider and a screen filter positioned at the opposed ends of the bushing. The filter screens impurities from the melt.

The foregoing references do not recognize or address the effect of temperature variations in molten material located at the periphery versus the center of the bushing. Such variations can cause uneven filament diameters, disruption of the fiber attenuation process and accumulation of devitrified material in the corners of the bushing.

SUMMARY OF THE INVENTION

The present invention provides a bushing for forming fibers from a molten fiberizable material, the bushing comprising: (a) a generally planar tip plate having an orifice region including a plurality of orifices to permit flow of a molten fiberizable material therethrough; (b) a side wall extending generally upwardly from a periphery of the tip plate to form a reservoir for supplying molten fiberizable material to the plurality of orifices of the tip plate; and (c) a substantially planar perforated plate positioned within the reservoir generally parallel to and substantially coextensive with the orifice region of the tip plate, the perforated plate comprising a central region and a peripheral region surrounding the central region, each of the central region and the peripheral region of the perforated plate having a plurality of openings to permit flow of molten fiberizable material therethrough, wherein average head loss of molten material flowing through the central region of the perforated plate is greater than average head loss of molten material flowing through the peripheral region of the perforated plate.

Another aspect of the present invention is a bushing for forming fibers from a molten fiberizable material, the bushing comprising: (a) a generally planar tip plate comprising a central region and a peripheral region surrounding the central region, each of the central region and the peripheral region having a plurality of orifices to permit flow of a molten fiberizable material therethrough; (b) a side wall extending generally upwardly from a periphery of the tip plate to form a reservoir for supplying molten fiberizable material to the plurality of orifices of the tip plate, the reservoir having a central region and a peripheral region surrounding the central region; and (c) a generally planar perforated plate positioned within the central region of the reservoir generally parallel to and substantially coextensive with the central region of the tip plate, the perforated plate having a plurality of openings positioned within the central region of the reservoir to permit flow of molten fiberizable material therethrough, wherein average head loss of molten material flowing through the central region of the reservoir is greater than average head loss of molten material flowing through the peripheral region of the reservoir.

Yet another aspect of the present invention is a bushing for forming fibers from a molten fiberizable material, the bushing comprising: (a) a generally planar tip plate having an orifice region including a plurality of orifices to permit flow of a molten fiberizable material therethrough; (b) a side wall extending generally upwardly from a periphery of the tip plate to form a reservoir for supplying molten fiberizable material to the plurality of orifices of the tip plate; and (c) a substantially planar perforated plate positioned within the reservoir generally parallel to and substantially coextensive with the orifice region of the tip plate, the perforated plate comprising a central region and a peripheral region surrounding the central region, each of the central region and the peripheral region of the perforated plate having a plurality of openings to permit flow of molten fiberizable material therethrough, wherein average pressure drop of molten material flowing through the central region of the perforated plate is greater than average pressure drop of molten material flowing through the peripheral region of the perforated plate.

Another aspect of the present invention is a bushing for forming fibers from a molten fiberizable material, the bushing comprising: (a) a generally planar tip plate having an orifice region including a plurality of orifices to permit flow of a molten fiberizable material therethrough; (b) a side wall extending generally upwardly from a periphery of the tip plate to form a reservoir for supplying molten fiberizable material to the plurality of orifices of the tip plate; and (c) a perforated plate positioned within the reservoir generally parallel to and substantially coextensive with the orifice region of the tip plate, the perforated plate comprising a central region and a peripheral region surrounding the central region, each of the central region and the peripheral region of the perforated plate having a plurality of openings to permit flow of molten fiberizable material therethrough, the plurality of openings of the central region having an average diameter which is less than an average diameter of the plurality of openings of the peripheral region, wherein average head loss of molten material flowing through the central region of the perforated plate is greater than average head loss of molten material flowing through the peripheral region of the perforated plate.

Another aspect of the present invention is a fiber forming assembly comprising: (a) a supply of molten fiberizable material; and (b) a bushing comprising: (1) a generally planar tip plate having a plurality of orifices to permit flow of the molten fiberizable material therethrough; (2) a side wall extending generally upwardly from a periphery of the tip plate to form a reservoir for supplying the molten fiberizable material to the plurality of orifices of the tip plate; and (3) a substantially planar perforated plate positioned within the reservoir generally parallel to and substantially coextensive with the tip plate, the perforated plate comprising a central region and a peripheral region surrounding the central region, each of the central region and the peripheral region of the perforated plate having a plurality of openings to permit flow of the molten fiberizable material therethrough, wherein average head loss of molten material flowing through the central region of the perforated plate is greater than average head loss of molten material flowing through the peripheral region of the perforated plate.

Yet another aspect of the present invention is a fiber forming assembly comprising: (a) a supply of molten fiberizable material; and (b) a bushing comprising: (1) a generally planar tip plate comprising a central region and a peripheral region surrounding the central region, each of the central region and the peripheral region having a plurality of orifices to permit flow of a molten fiberizable material therethrough; (2) a side wall extending generally upwardly from a periphery of the tip plate to form a reservoir for supplying the molten fiberizable material to the plurality of orifices of the tip plate, the reservoir having a central region and a peripheral region surrounding the central region; and (3) a generally planar perforated plate positioned within the central region of the reservoir generally parallel to and substantially coextensive with the central region of the tip plate, the perforated plate having a plurality of openings positioned within the central region of the reservoir to permit flow of the molten fiberizable material therethrough, wherein average head loss of molten material flowing through the central region of the reservoir is greater than average head loss of molten material flowing through the peripheral region of the reservoir.

Another aspect of the present invention is a method for forming fibers from a molten fiberizable material, the method comprising the steps of: (a) supplying molten fiberizable material to a reservoir of a bushing; (b) flowing the molten fiberizable material through a substantially planar perforated plate positioned within the reservoir generally parallel to and substantially coextensive with a tip plate of the bushing, the perforated plate comprising a central region and a peripheral region surrounding the central region, each of the central region and the peripheral region of the perforated plate having a plurality of openings to permit flow of the molten fiberizable material therethrough, wherein average head loss of molten material flowing through the central region of the perforated plate is greater than average head loss of molten material flowing through the peripheral region of the perforated plate; and (c) attenuating a fiber at each of a plurality of orifices of the tip plate.

Another aspect of the present invention is a method for forming fibers from a molten fiberizable material, the method comprising the steps of: (a) supplying molten fiberizable material to a reservoir of a bushing, the reservoir having a central region and a peripheral region surrounding the central region; (b) flowing the molten fiberizable material through a substantially planar perforated plate positioned within the central region of the reservoir generally parallel to and substantially coextensive with a central region of a tip plate, the perforated plate having a plurality of openings positioned within the central region of the reservoir to permit flow of the molten fiberizable material therethrough, wherein average head loss of molten material flowing through the central region of the reservoir is greater than average head loss of molten material flowing through the peripheral region of the reservoir; and (c) attenuating a fiber at each of a plurality of orifices of the tip plate.

BRIEF DESCRIPTION OF THE DRAWINGS

The foregoing summary, as well as the following detailed description of the preferred embodiments, will be better understood when read in conjunction with the appended drawings. In the drawings:

FIG. 5 is a cross-sectional front elevational view of the bushing of FIG. 3, taken along lines 5—5 of FIG. 3;

FIG. 6 is a cross-sectional front elevational view of an alternative embodiment of a bushing, according to the present invention;

DETAILED DESCRIPTION OF THE INVENTION

The present invention reduces temperature variation within the molten fiberizable material in the bushing, thereby increasing filament diameter uniformity and reducing fiber breakage during attenuation. In a conventional bushing, molten material at the periphery of the bushing reservoir tends to be cooler than molten material nearer the center. When positioned within a bushing reservoir, the perforated plate of the present invention enhances temperature and compositional uniformity of the molten material contained therein by increasing flow and passive mixing at the periphery of the bushing reservoir proximate the side walls and end walls of the bushing and decreases accumulation of devitrified material in these areas. The perforated plate of the present invention provides an additional heat source for thermally conditioning the molten material contained within the bushing, screens refractory materials and batch particulates from the molten material and may shield the bushing tip plate from radiant heat emanating from the forehearth combustion apparatus.

An important aspect of the present invention is the bushing, which will be discussed in detail below. To better understand this important aspect of the invention, the fiber forming assembly in which such a bushing is useful will first be discussed. The present invention will be discussed generally in connection with its use in forming glass fibers, although one skilled in the art would understand that other types of fibers can be formed according to the present invention, as set forth above.

Figure 1:
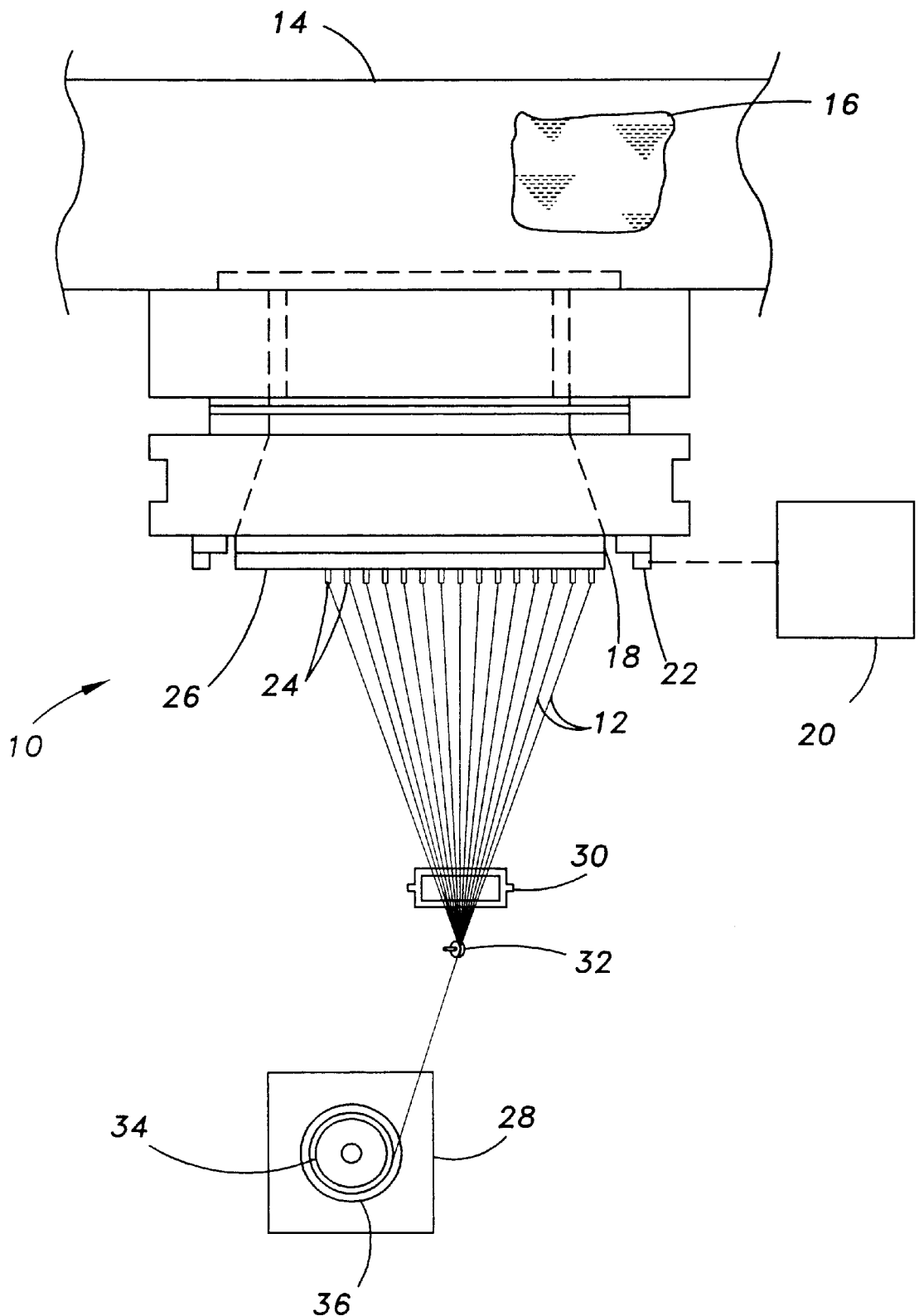
FIG. 1 is a schematic front elevational view of a fiber forming apparatus, in accordance with the present invention.

Referring to the drawings, wherein like numerals indicate like elements throughout, there is shown in FIG. 1 a fiber forming apparatus, indicated generally at 10, for producing a plurality of continuous fibers 12. As used herein, the term "fibers" means a plurality of individual filaments. The preferred material from which the fibers are formed is glass, although one skilled in the art would understand that the present bushing, assembly and methods can be useful for forming fibers from other fiberizable materials, such as natural organic polymers, synthetic organic polymers or inorganic substances, which can be drawn into fibers by attenuation through an orifice or nozzle. See *Encyclopedia of Polymer Science and Technology*, Vol. 6 at 506–507. As used herein, the term "fiberizable" means a material capable of being formed into a generally continuous filament.

Useful glass materials include any type of fiberizable glass composition known to those skilled in the art, such as "E-glass", "A-glass", "C-glass", "D-glass", "R-glass", "S-glass", and E-glass derivatives that are fluorine-free and/or boron-free. Such compositions and methods of making glass filaments therefrom are well known to those skilled in the art and further discussion thereof is not believed to be necessary in view of the present disclosure. If additional information is needed, such glass compositions and fiberization methods are disclosed in K. Loewenstein, *The Manufacturing Technology of Glass Fibres*, (3d Ed. 1993) at pages 30–36, which are hereby incorporated by reference.

The fiber forming apparatus 10 comprises a glass melting furnace or forehearth 14 containing a supply of molten fiberizable material or glass 16 having a metallic bushing 18 attached to the bottom of the forehearth 14. Typical forehearths are shown in *Loewenstein* (3d Ed.) at pages 85–101, which are hereby incorporated by reference. Alternatively, the fiber forming apparatus can be, for example, a forming device for synthetic textile fibers or strands in which fibers are drawn through nozzles from a supply of molten fiberizable material.

Bus bars are connected to an electrical energy source 20 and to the bushing 18 at conductors 22 to heat the bushing 18 and molten glass 16 contained therein. The molten glass 16 is drawn from the bottom of the bushing 18 through a plurality of nozzles or orifices 24 in a tip plate 26 by a winder 28 to form the glass fibers 12. Typically, the glass fibers 12 are contacted with an applicator 30 to apply a sizing composition thereto, gathered by a guide 32 and wound about a rotatable collet 34 of a winder 28 to form a forming package 36. Examples of suitable sizing compositions and winders are set forth in *Loewenstein* (3d Ed.) at pages 186–194 and 237–287, which are hereby incorporated by reference.

Figure 2:
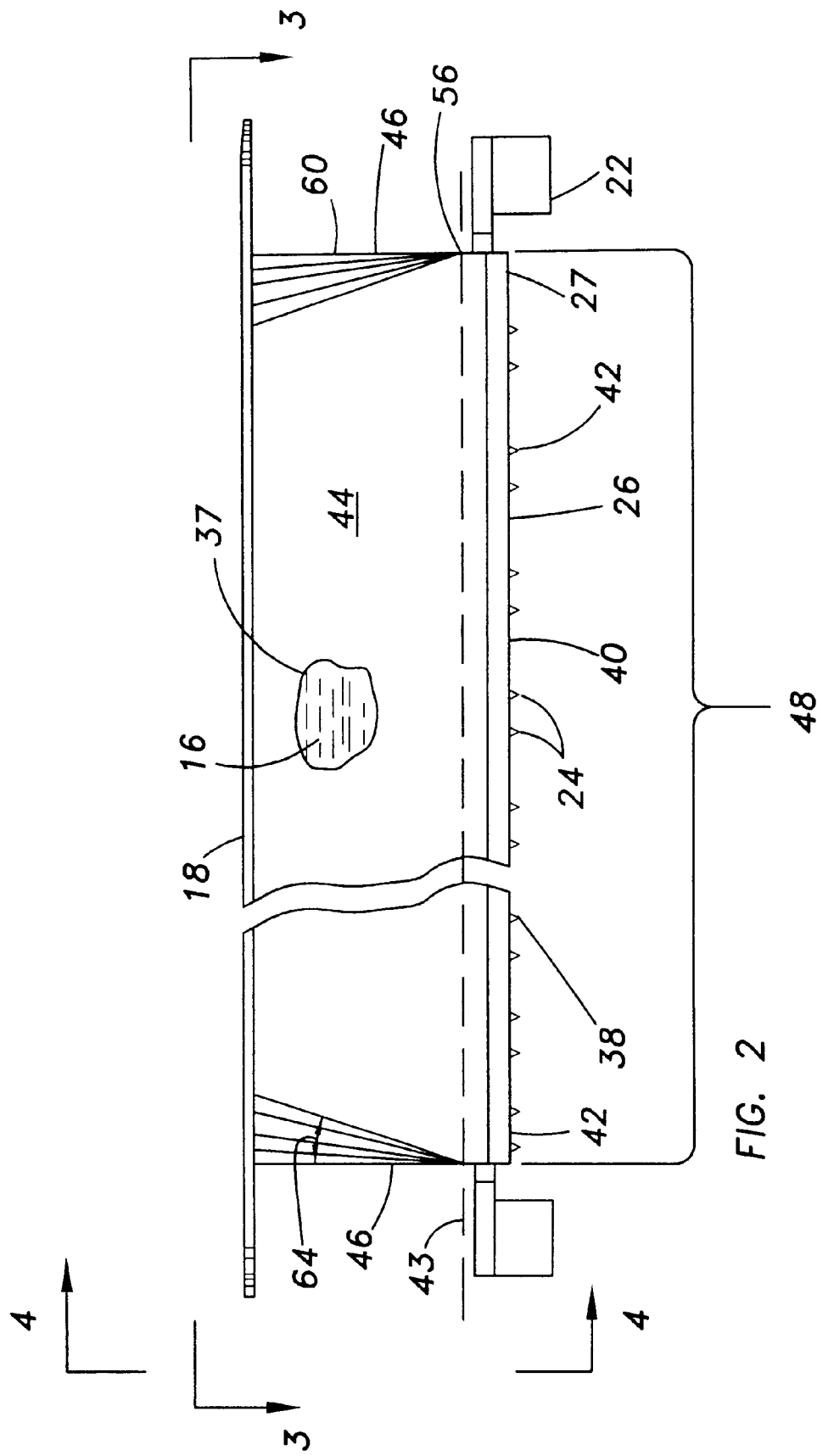
FIG. 2 is a front elevational view of a bushing, in accordance with the present invention.
Figure 4:
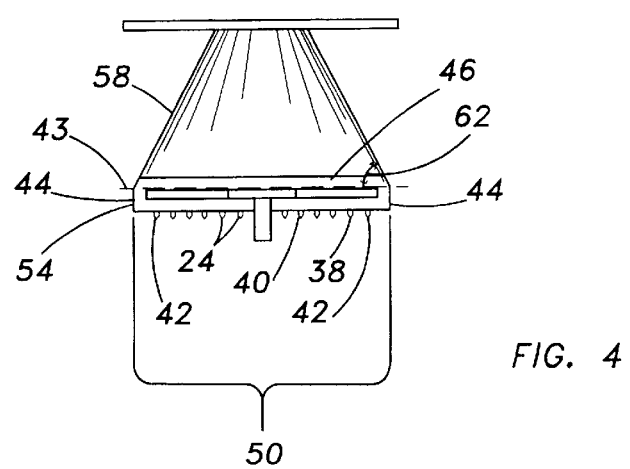
FIG. 4 is an end view of the bushing of FIG. 2, taken along lines 4—4 of FIG. 2.
Figure 20:
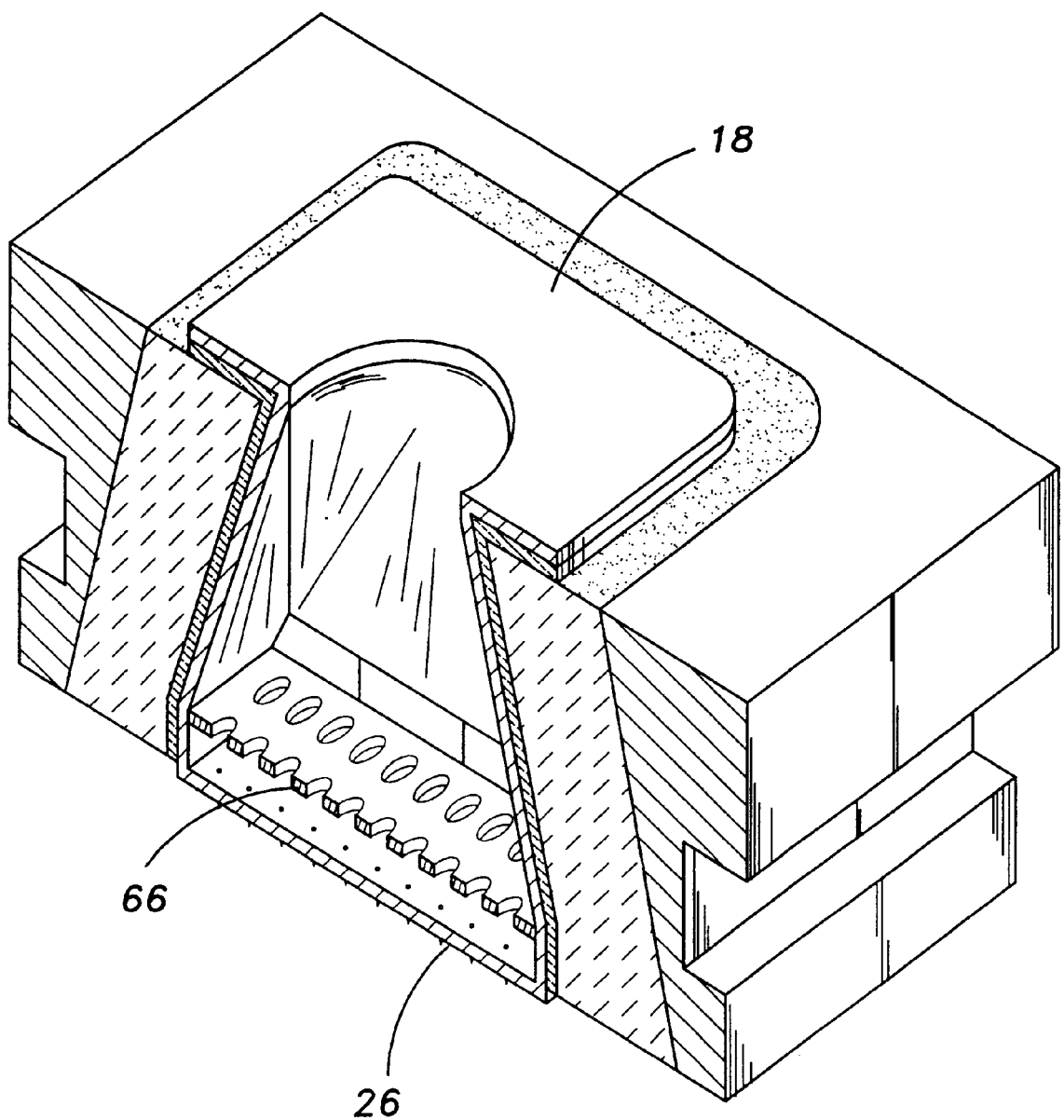
FIG. 20 is a perspective view of a bushing assembly, according to the present invention.

Referring now to FIGS. 2, 4 and 20, the bushing 18 comprises a generally planar tip plate 26. The length 48 and width 50 of the tip plate 26 can vary, but generally the length 48 of the tip plate 26 ranges from about 25 to about 127 centimeters (cm) (about 10 to about 50 inches) and the width 50 ranges from about 6 to about 25 cm (about 2.5 to about 10 inches). As shown in FIG. 5, the tip plate 26 generally has a thickness 52 of about 1 to about 3 millimeters (mm) (about 0.04 to about 0.12 inches), and preferably about 1 to about 2.5 mm (about 0.04 to about 0.1 inches). One skilled in the art would understand that the dimensions of the tip plate 26 can vary, as desired.

As shown in FIG. 2, the tip plate 26 has an orifice region 38 including a plurality of orifices 24 through which molten glass 16 is drawn in the form of individual fibers 12 or filaments at a high rate of speed. See *Loewenstein* (3d Ed.) at pages 118–148, which are hereby incorporated by reference. The orifices 24 are maintained at a generally uniform temperature during drawing of the molten glass 16 therethrough. The bushing 18 conditions the glass so that the fibers 12 produced have an essentially uniform diameter.

The orifice region 38 comprises a central region 40 which is surrounded by a peripheral region 42. The central region 40 generally comprises between about 25 to about 85 percent of the total surface area of the orifice region 38, and preferably about 50 to about 65 percent. The length and width of the central region 40 can vary depending upon the dimensions of the tip plate 26. The peripheral region 42 includes portions of the orifice region 38 which are adjacent to the side walls 44 and end walls 46 of the bushing 18. In a conventional bushing, molten glass adjacent this peripheral region 42 tends to be cooler than molten glass adjacent the central region 40, contributing to fiber breakage and non-uniform filament diameters.

Referring now to FIGS. 2 and 4, the bushing 18 comprises at least one side wall extending generally upwardly from a periphery 27 of the tip plate 26 to form a supply or reservoir 37 for containing the molten glass 16. Preferably, the bushing 18 comprises a pair of opposed side walls 44 and a pair of opposed end walls 46 extending upwardly from the periphery 27. The side walls 44 and end walls 46 can be generally planar or curved, as desired. As shown in FIG. 2, each of the side walls 44 and end walls 46 preferably include a generally planar lower portion 54, 56 proximate the tip plate 26 and an upper portion 58, 60. The upper portions 58, 60 of side walls 44 are inclined at an angle 62 with respect to the corresponding lower portions 54, 56. The angle 62 can range from about 45° to about 90°. Corner portions 59 of the upper portions 58, 60 of the end walls 46 are. inclined at an angle 64 with respect to the corresponding lower portions 56 of the end walls 46. The angle 64 can range from 0° to about 45°.

The shape of the reservoir 37 can be generally cylindrical, a square box, or preferably a rectangular box formed by the opposed side walls 44 and opposed end walls 46. The reservoir 37 includes a central region 39 and a peripheral region 41 surrounding the central region 39. Central region 39 corresponds generally to the central region 40 of the tip plate 26. The central region 39 generally comprises between about 25 to about 85 percent of the total surface area of any generally horizontal plane 43 extending through the reservoir 37, and preferably about 50 to about 65 percent. The peripheral region 41 includes portions of the reservoir 37 which are adjacent to the side walls 44 and end walls 46 of the bushing 18 and corresponds generally to the peripheral region 42 of the tip plate 26.

The components of the bushing 18, such as the side walls 44, end walls 46, tip plate 26 and perforated plate (discussed below), are formed from a metallic material or alloys thereof by conventional metalworking and processing techniques well known to those skilled in the art. The metallic material must be resistant to corrosion by glass, not degrade to contaminate the glass, oxidation resistant, and possess steady electrical resistance and resistance to creep (deformation under load, which is a function of stress). See *Loewenstein* (3d Ed.) at pages 122–126, which are hereby incorporated by reference.

Non-limiting examples of suitable metallic materials for forming the components of the bushing 16 include platinum, rhodium and alloys thereof. Preferably, the metallic material is about a 10% to about 20% rhodium-platinum alloy, and more preferably about 10% rhodium-platinum alloy. The metallic materials can be dispersion strengthened or grain-stabilized to reduce creep, if desired. If more information regarding suitable dispersion strengthened or grain-stabilized metallic materials, see *Loewenstein* (3d Ed.) at page 124. Dispersion strengthened metal metallic plates are commercially available as ZGS products from Johnson, Matthey & Co. Ltd. of Malvern, Pa.

The preferred bushing 18 is formed by joining the pair of opposed side walls 44 and the pair of opposed end walls 46 to the tip plate 26 by welding to form the bushing 18. A suitable welding technique is the tungsten inert gas welding technique, which is well known to those skilled in the art. A non-limiting example of a suitable bushing is disclosed in U.S. Pat. No. 5,147,431, which is hereby incorporated by reference.

Figure 3:
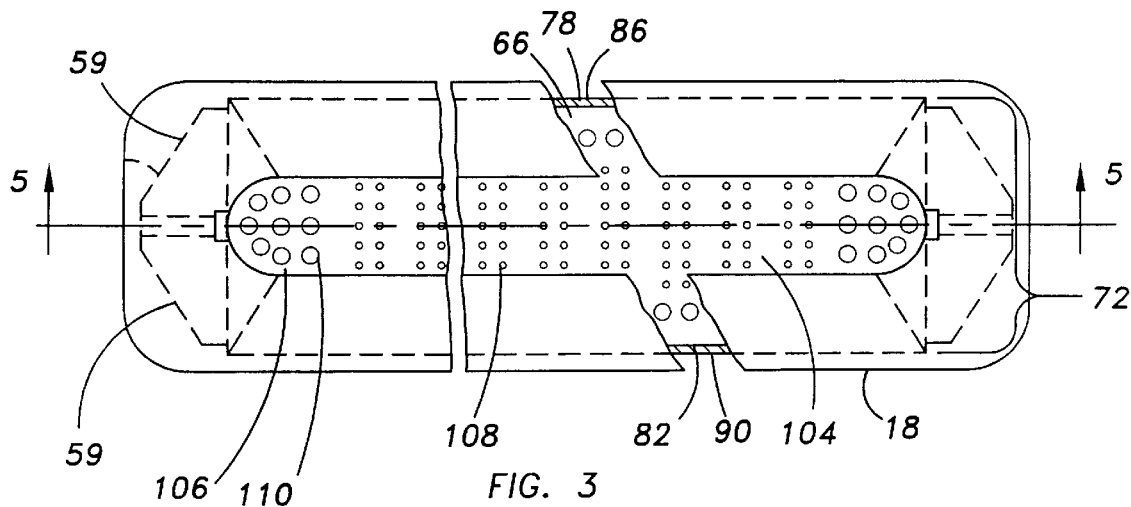
FIG. 3 is a top plan view of the bushing of FIG. 2, taken along lines 3—3 of FIG. 2.
Figure 18:
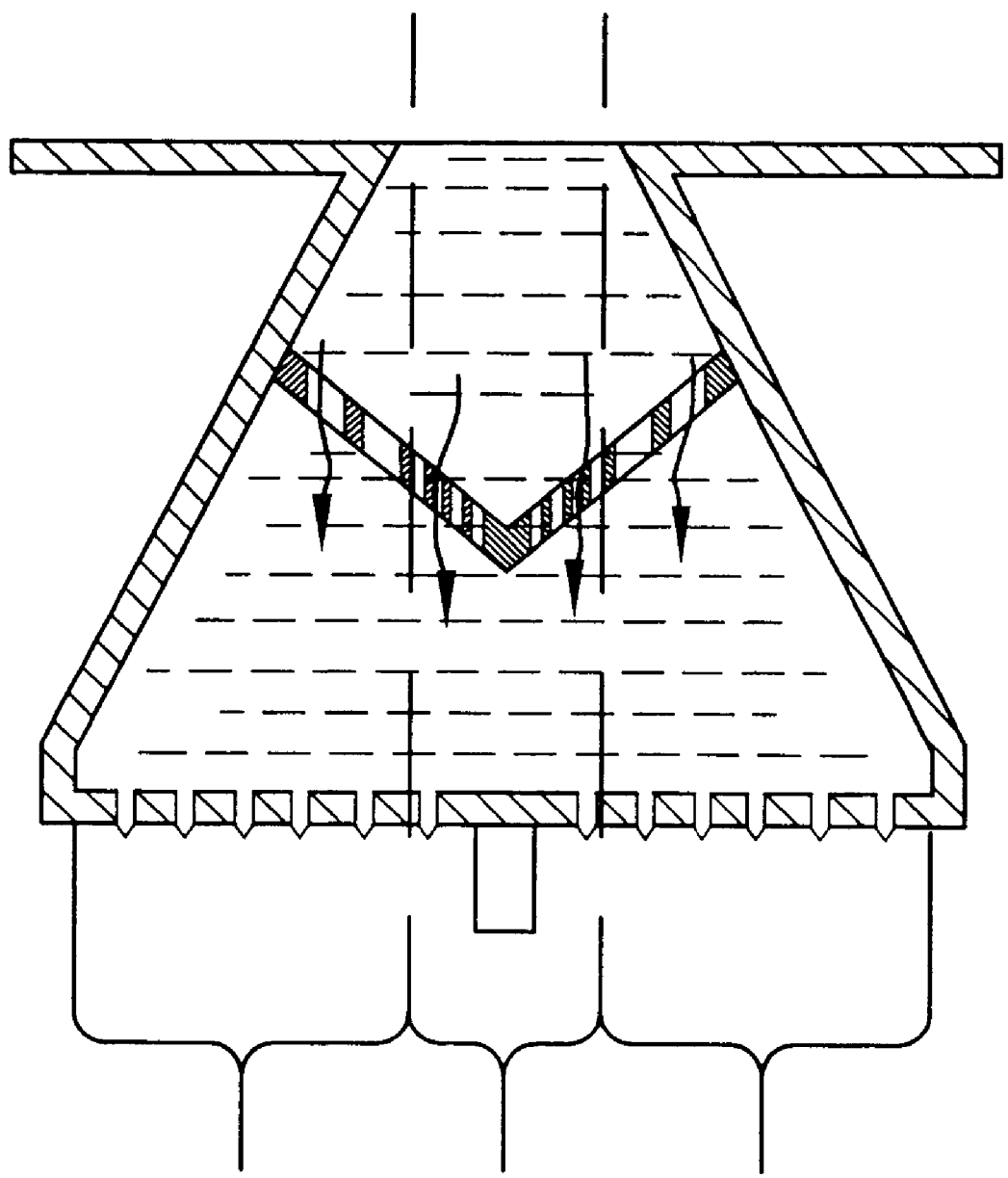
FIG. 18 is a cross-sectional view of a bushing having an alternative embodiment of a perforated plate, according to the present invention.
Figure 19:
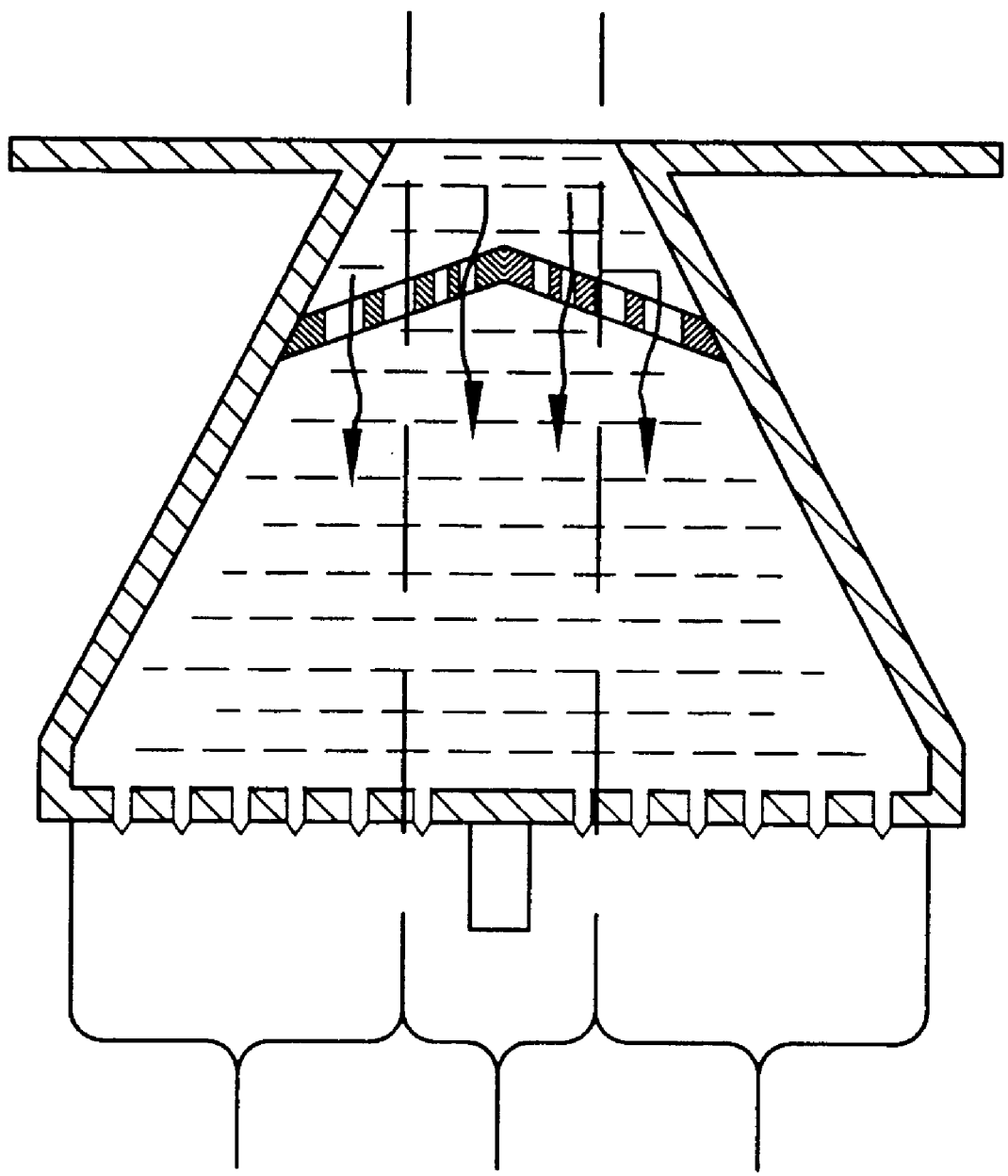
FIG. 19 is a cross-sectional view of a bushing having another alternative embodiment of a perforated plate, according to the present invention.

Referring now to FIGS. 3 and 5, the bushing 18 of the present invention comprises one or more perforated plates 66 positioned within the reservoir 37 generally parallel to and coextensive with the orifice region 38 of the tip plate 26. The perforated plate 66 is preferably substantially planar or flat, although in alternative embodiments shown in FIGS. 18 and 19 the perforated plate is generally "v"-shaped or an inverted "v"-shape, respectively.

The length 70 and width 72 of the preferred perforated plate 66 generally correspond to the length 48 and width 50 of the tip plate 26 such that the perforated plate 66 is substantially coextensive with the tip plate 26. As used herein "substantially coextensive" means that the upper surface 68 of the perforated plate 66 has an average overall surface area which is between about 75 percent and 100 percent of the average overall surface area of the orifice region 38 of the upper surface 76 of the tip plate 26. Preferably the perforated plate 66 is fully coextensive with the orifice region 38 of the tip plate 26 and more preferably the perforated plate 66 is fully coextensive with the entire tip plate 26.

The length 70 and width 72 of the perforated plate 66 can vary, but generally the length 70 of the perforated plate 66 ranges from about 25 to about 127 cm (about 10 to about 50 inches) and the width 72 ranges from about 6 to about 25 cm (about 2.5 to about 10 inches). As shown in FIG. 5, the perforated plate 66 generally has a thickness 74 of about 0.25 to about 1.3 mm (about 0.01 to about 0.05 inches), and preferably about 0.38 to about 0.76 mm (about 0.015 to about 0.030 inches), although the thickness can vary.

The perforated plate 66 includes at least one outside edge which is adjacent to a portion of the side wall of the bushing 18, and preferably includes four outside edges 78, 80, 82, 84 adjacent to and preferably contacting corresponding portions 86, 88, 90, 92 of the respective lower portions 54, 56 of side walls 44 and end walls 46. The perforated plate 66 is positioned generally parallel, and preferably is parallel, to the tip plate 26. The distance 93 between the upper surface 76 of the tip plate 26 and the lower surface 94 of the perforated plate 66 ranges from about 5 mm to about 75 mm, and preferably about 10 to about 15 mm.

Figure 8:
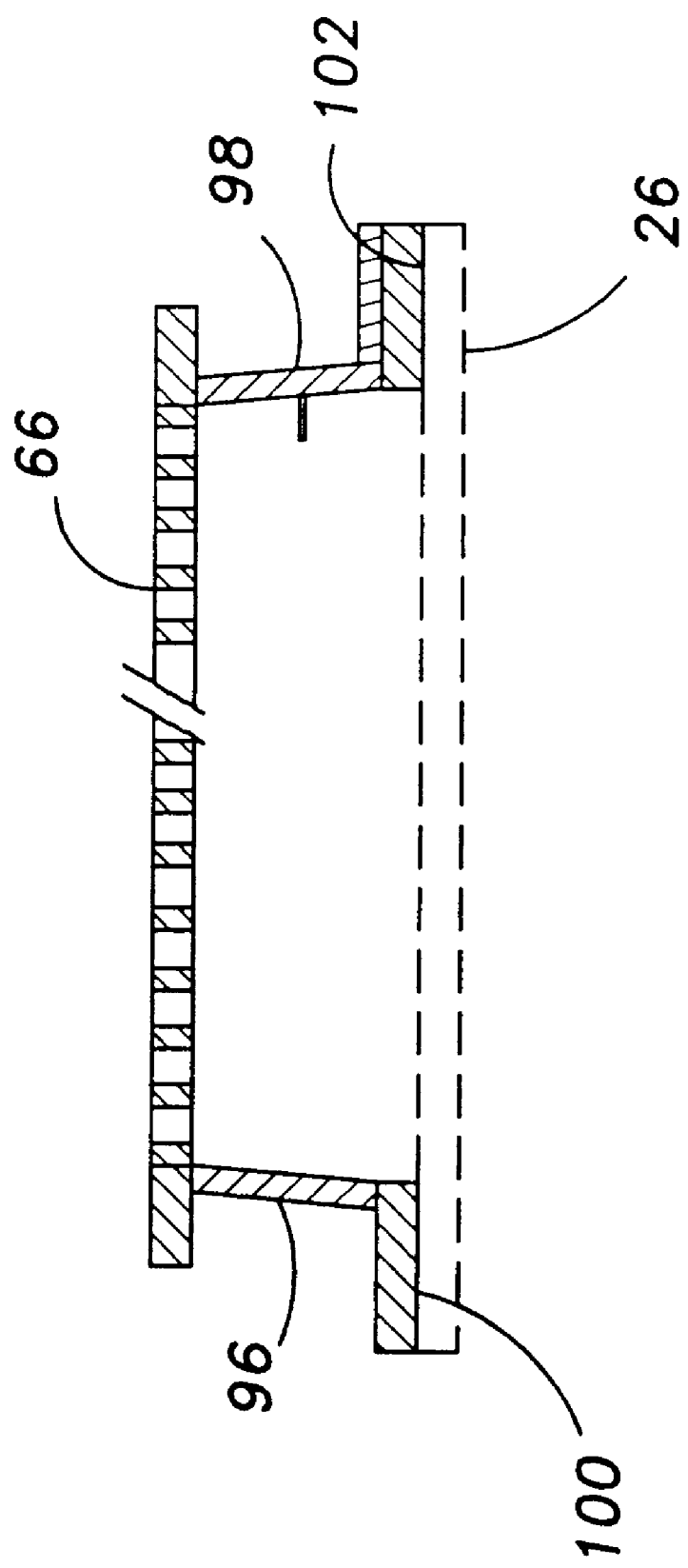
FIG. 8 is a cross-sectional view of the perforated plate of FIG. 7, taken along lines 8—8 of FIG. 7.

The perforated plate 66 can be connected to the portions 86, 88, 90, 92 of the side walls 44 and end walls 46, although preferably the perforated plate 66 is supported within the reservoir 37 by one or more columns or supports 96, 98 (shown in FIG. 8) which rest upon the tip plate 26 (shown in phantom). The supports 96, 98 are preferably positioned to rest upon portions 100, 102 of the tip plate 26 outside of the orifice region 38 proximate the side walls 44 and/or end walls 46 to minimize disruption of flow of the molten material through the bushing 18. Alternatively or additionally, one or more supports can be positioned within the orifice region 38 of the tip plate 26.

In an alternative embodiment shown in FIG. 6, a second generally planar perforated plate 610 is positioned generally parallel to and spaced apart from perforated plate 666. The distance 612 between the upper surface 674 of the perforated plate 666 and lower surface 614 of the second perforated plate 610 ranges from about 2.5 mm to about 25 mm, and preferably about 8 to about 16 mm.

Figure 16:
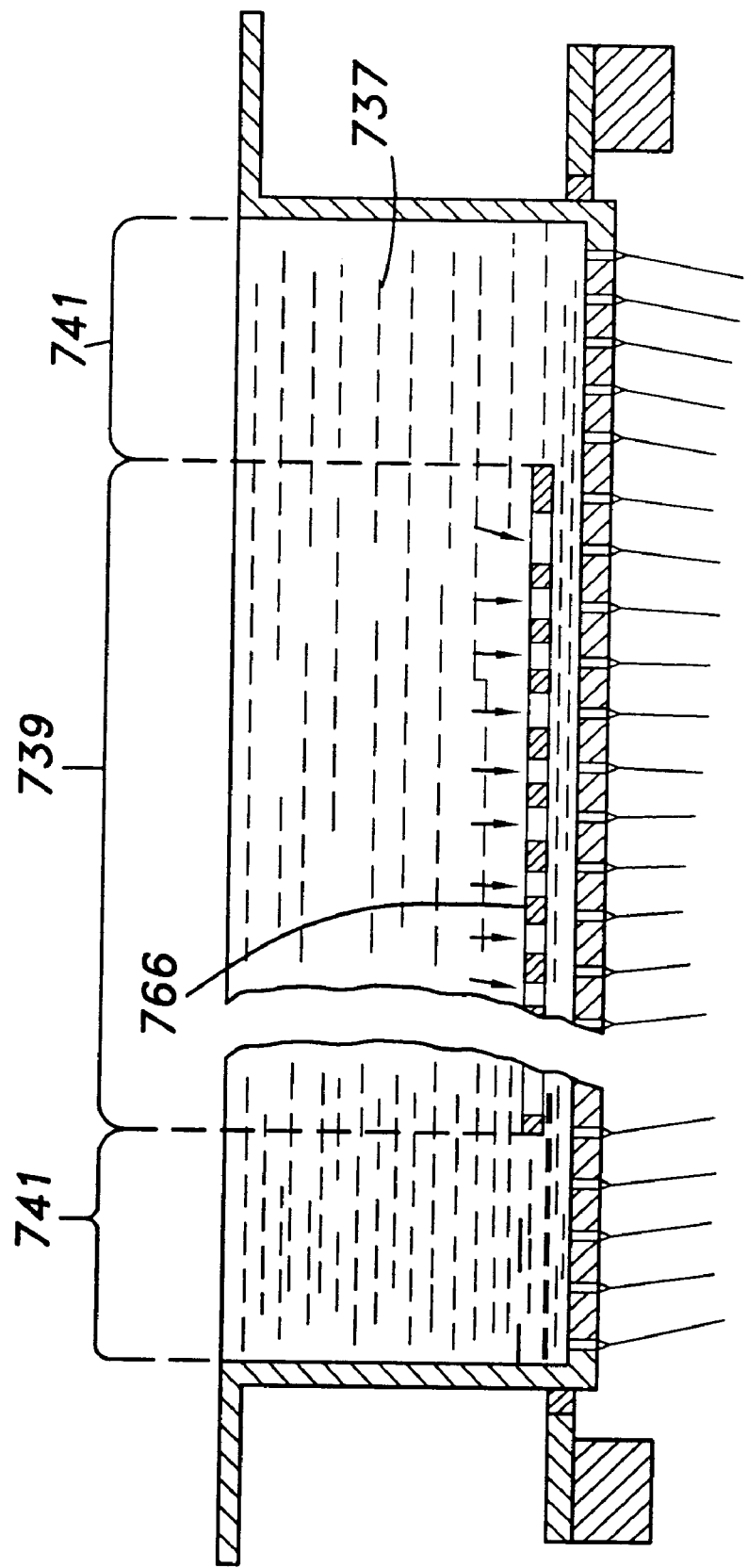
FIG. 16 is a cross-sectional front elevational view of another alternative embodiment of a bushing, according to the present invention.
Figure 17:
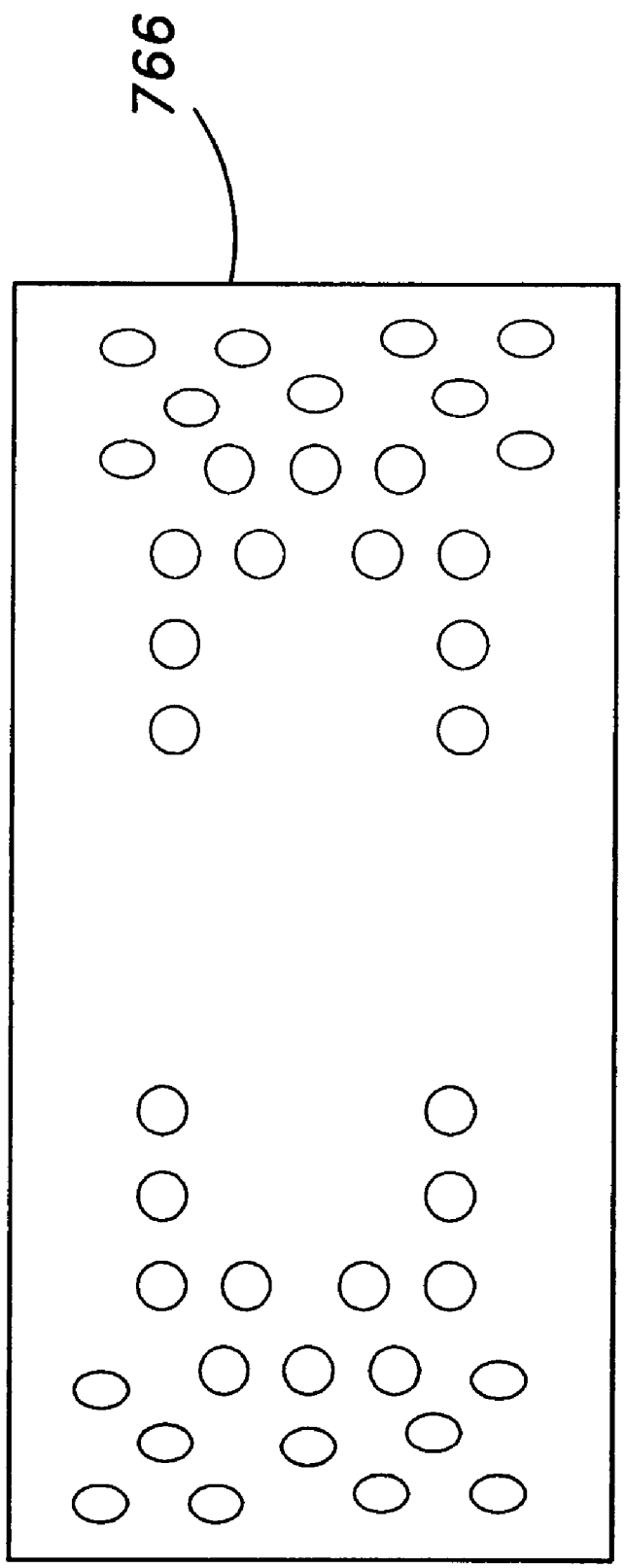
FIG. 17 is a top plan view of a perforated plate of the alternative embodiment of the bushing of FIG. 16.

In another alternative embodiment shown in FIGS. 16 and 17, the perforated plate 766 is positioned coextensive within only the central region 739 of the reservoir 737 to provide greater flow resistance through the central region 739 of the reservoir 737 than the peripheral region 741 of the reservoir 737.

The perforated plate 66, 610, 666, 766 includes aperture(s) or opening(s) for permitting the flow of the molten glass 12 therethrough. The perforated plate 66 has a central region 104 and a peripheral region 106 surrounding the central region 104. Each of the central region 104 and the peripheral region 106 include one or more openings 108, 110, respectively. As shown for example in FIGS. 7 and 9, the peripheral region 228 can include a plurality of subregions 230, 240, 250 which contain openings of different sizes or configurations. For example, the peripheral region 228 can include end regions 230, 232, side regions 250, 252 and corner regions 240, 242, 244, 246. Similarly, the central region 216 can comprise two or more subregions.

Preferably subregions having the same opening configuration are symmetrical about a longitudinal axis 220 and an axis 222 which bisects the width 214 of the perforated plate 210, although the subregions can have any configuration, such as an asymmetrical configuration, which provides less flow resistance in the peripheral region 228 than the central region 216. For ease of manufacture, the central and peripheral regions are preferably separated by small regions 256 in which there are no perforations.

Referring now to FIGS. 3 and 5, the opening(s) 108 in the central region 104 of the perforated plate 66 provide greater flow resistance than the opening(s) 110 of the peripheral region 106 of the perforated plate. The difference in flow resistance can be achieved in a number of different ways. For example, if the openings 108 are the same size as openings 110, the number of openings 110 in the peripheral region 106 can be greater than the number of openings 108 in the central region 104. Alternatively, the peripheral region 106 can have one or more openings 110 which have a larger diameter than at least one of the openings 108 in the central region 104, as shown in FIG. 3. The peripheral region 106 of the perforated plate 66 generally has a larger total area for flow through its openings 110 than the total area for flow through the plurality of openings 108 in the central region 104.

The openings 108, 110 can have any shape, such as for example square, rectangular, triangular or preferably circular. The diameter of a circular opening generally can range from about 1 to about 5 mm, and preferably ranges from about 1.5 to about 3 mm. The openings 108, 110 extending through the thickness 74 of the perforated plate 66 can be tapered to have a larger diameter at the upper surface 68 of the perforated plate than the lower surface 94 of the perforated plate. Alternatively, the diameter of the openings 108, 110 can be smaller at the upper surface 68 than the lower surface 94, as desired.

The openings can be positioned along an axis which is generally parallel to the longitudinal axis or offset, as desired. The spacing or pitch between the openings 108, 110 can range from about 0.5 mm to about 10 mm.

The head loss of molten material provided by the perforated plate 66 is a function of the thickness 74 of the perforated plate 66, the configuration, number and position of the openings 108, 110 and the viscosity of the molten material at the temperature in the proximity of the perforated plate. As used herein, head loss represents the decrease (loss) in mechanical energy between the inlet and outlet of an opening in the perforated plate. See W. Hughes et al., *Schaum's Outline of Theory and Problems of Fluid Dynamics*, (1967) at pages 63, 75–105, which are hereby incorporated by reference. The head loss ($H_L$) provided by a circular opening of the perforated plate can be determined according to equation (I) as follows:

$$H_L = \frac{\Delta P}{\rho g} = (L/D)(V^2/2g)(f) + (KV^2/2g) \tag{I}$$

where $H_L$ is the head loss (meters (m)); $\Delta P$ is the pressure drop of the molten material through the opening (Newtons/square meter ($N/m^2$)); $\rho$ is the density of the molten material at the temperature in the proximity of the perforated plate (kilograms/cubic meter ($kg/m^3$)); g is gravity (meters/seconds squared ($m/s$)); L is thickness of the perforated plate (m); D is the diameter of the opening (m); V is the velocity of the molten material through the opening (m/s); f is the friction factor for laminar flow; and K is the head loss coefficient. *Schaum's* at pages 89–90.

The friction factor (f) for laminar flow can be readily determined by one skilled in the art from the following equation (II):

$$f = 64/N_R = (64\mu)/DV \tag{II}$$

where $N_R$ is the Reynolds number for laminar flow and $\mu$ is the dynamic viscosity of the molten material at the temperature in the proximity of the perforated plate ($N \ s/m^2$).

The head loss coefficient (K) can be readily approximated by one skilled in the art using the dimensions of the opening and physical characteristics of the molten material, such as its viscosity, by a commercially available iterative computer program such as CFX-4 which is available from AEA Technologies of Great Britain. Examples of head loss coefficients are given in *Schaum's* at page 90.

For example, the head loss of molten glass is 0.043 m for the following conditions: temperature of about 1480° K., density of about 2500 $kg/m^3$, dynamic viscosity of about 75.2 $N \ s/m^2$, and a velocity of about 0.0014 m/s where $f=2.99\times10^6$ and $K=1.82\times10^5$ through an opening having a diameter of about 0.001613 meters in a perforated plate having a thickness of 0.00046 meters. The pressure drop can be determined readily from Equation (I).

The average head loss and pressure drop for each region of the perforated plate, such as the central region and peripheral region, is determined by averaging the head loss or pressure drop, respectively, for each opening across the selected region. Preferably, the average head loss for the central region ranges from about 0.0025 to about 0.15 m, and more preferably about 0.0025 to about 0.13 m. The average head loss for the peripheral region is less than that of the central region and preferably ranges from about 0 to about 0.1 m.

A method according to the present invention for forming fibers from a molten fiberizable material will now be described generally. The method comprises an initial step of supplying molten fiberizable material to a reservoir of a bushing, preferably from a forehearth containing molten glass, as discussed above. The molten fiberizable material flows through a substantially planar perforated plate positioned within the reservoir generally parallel to and substantially coextensive with a tip plate of the bushing. The perforated plate comprises a central region and a peripheral region surrounding the central region, as discussed above. Each of the central region and the peripheral region of the perforated plate has a plurality of openings to permit flow of the molten fiberizable material therethrough. The flow resistance through the central region of the perforated plate is greater than flow resistance through the peripheral region of the perforated plate. At least one fiber is attenuated at each of a plurality of orifices of the tip plate.

In an alternative embodiment, the reservoir has a central region and a peripheral region surrounding the central region. The molten fiberizable material flows through a substantially planar perforated plate positioned within the central region of the reservoir generally parallel to and substantially coextensive with a central region of a tip plate. The perforated plate has a plurality of openings positioned within the central region of the reservoir to permit flow of the molten fiberizable material therethrough. The flow resistance through the central region of the reservoir is greater than flow resistance through the peripheral region of the reservoir.

The bushings, assemblies and methods of the present invention will now be illustrated by the following specific, non-limiting examples.

EXAMPLE 1

Figure 7:
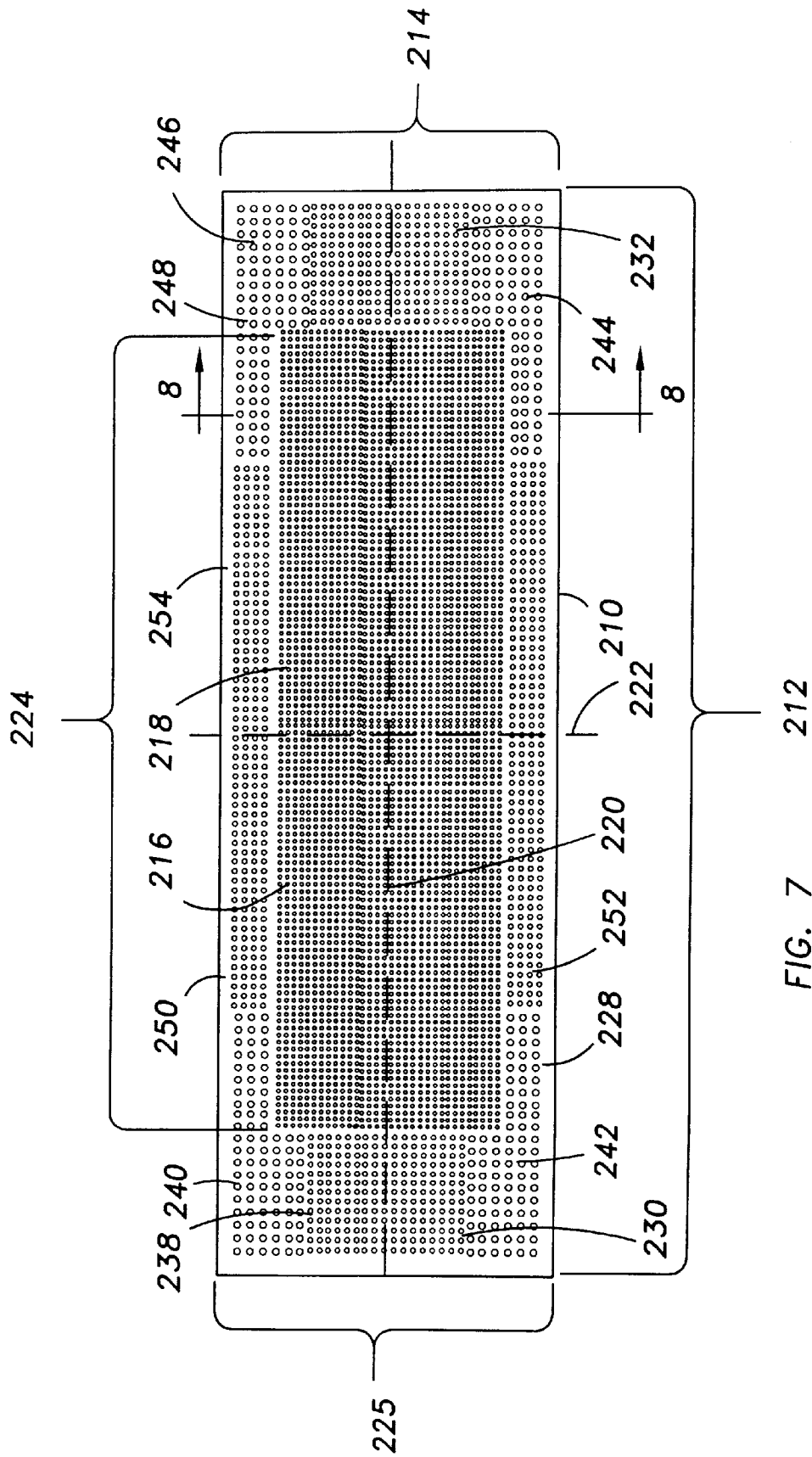
FIG. 7 is a top plan view of a preferred embodiment of a perforated plate, according to the present invention.

Referring to FIG. 7, there is shown a perforated plate 210 for use in a bushing according to the present invention having a tip plate configured to produce two forming packages of G-75 strand designation fibers. As is well known to those skilled in the art, the designation G-75 means a fiber strand of about 400 filaments having an average filament diameter of about 9.5 micrometers ($\mu$m) and a tex of about 68 (about 7300 yards per pound). The perforated plate 210 was fabricated from a platinum alloy having about 10 percent rhodium. The length 212 of the perforated plate 210 is about 0.3048 meters, its width 214 is about 0.092 meters and its thickness is about 0.00046 meters. The lower surface of the perforated plate was positioned about 12 mm above the upper surface of the tip plate in the bushing.

Perforated plate 210 comprises a central region 216 having a plurality of openings 218. The central region 216 is located symmetrically about longitudinal axis 220 and an axis 222 which bisects the width of the perforated plate 210. The length 224 of the central region is about 0.22 meters and its width 225 is about 0.06 meters. The central region 216 comprises about 49 percent of the total surface area of the perforated plate 210.

Figure 9:
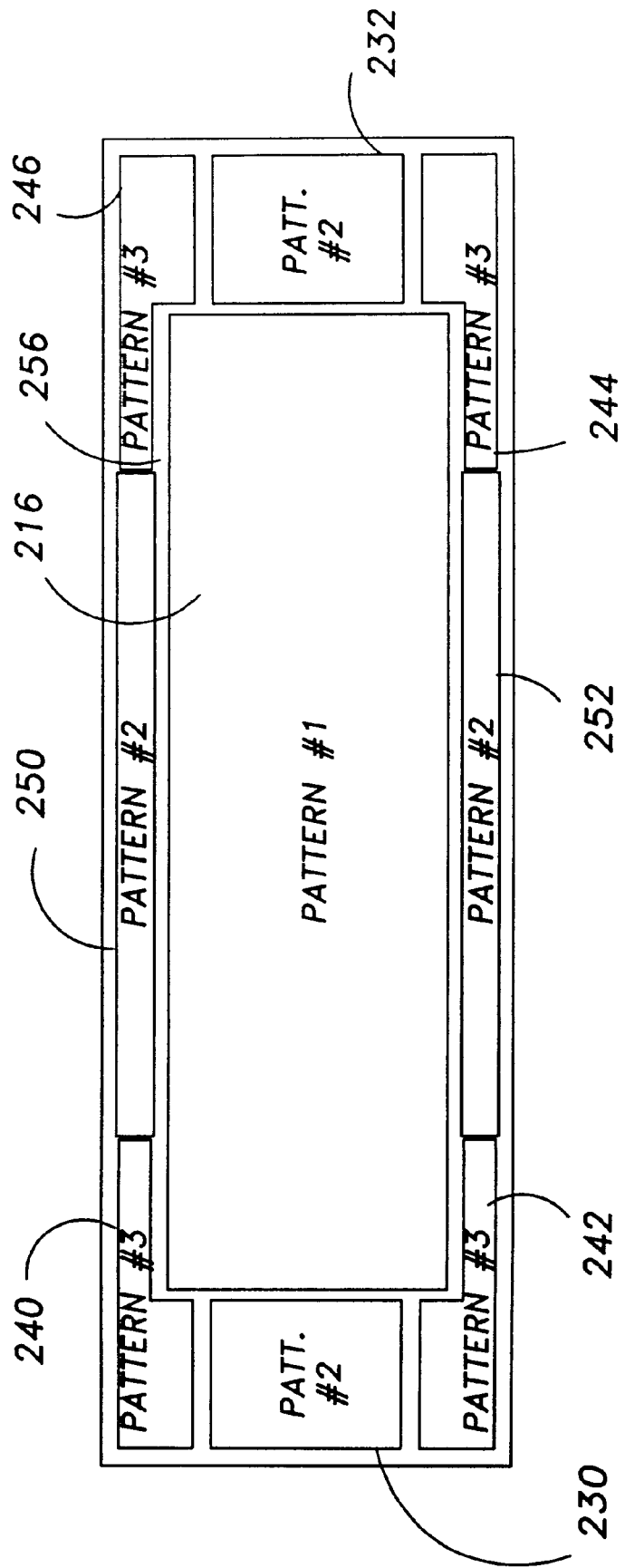
FIG. 9 is a diagram of the pattern of openings of the perforated plate of FIG. 7.

The central region 216 is shown more clearly in FIG. 9, which is a schematic diagram showing the different opening patterns of perforated plate 210. The central region 216 is indicated as having pattern #1, in which each opening 218 has a diameter of about 1.6 mm (about 0.064 inches) and the openings 218 are spaced apart to provide about 15 openings per square centimeter (cm) (about 98 openings per square inch). The head loss for an opening 218 in the central region of the perforated plate is determined from Equation (I) above using a velocity of about 0.0014 m/s, dynamic viscosity of about 75.2 kg/ms, density of about 2500 kg/m$^3$, friction factor (f) of about 2.99×10$^6$ and head loss coefficient (K) of about 1.82×10$^5$. The average head loss provided by the central region 216 of the perforated plate 210 was about 0.043 m.

Perforated plate 210 also comprises a peripheral region 228 which surrounds central region 216. Peripheral region 228 is divided into a plurality of subregions, including opposed end regions 230, 232 which when the perforated plate is installed in the reservoir of a bushing are positioned proximate the end walls. Each of the end regions 230, 232 has openings 238 arranged in pattern #2, in which each opening 238 has a diameter of about 1.6 mm (about 0.064 inches) and the openings 238 are spaced apart to provide about 22 openings per square cm (about 144 openings per square inch). The head loss for an opening 238 in the end regions 230, 232 of the perforated plate is determined from Equation (I) above using a velocity of about 0.0008 m/s, dynamic viscosity of about 100.5 kg/ms, density of about 2500 kg/m$^3$, friction factor (f) of about 6.99×10$^6$ and head loss coefficient (K) of about 4.27×10$^5$. The average head loss provided by the end regions 230, 232 of the perforated plate 210 was about 0.032 m.

The peripheral region 228 comprises corner regions 240, 242, 244, 246 having openings 248 arranged in pattern #3, in which each opening 248 has a diameter of about 3.05 mm (about 0.120 inches) and the openings 248 are spaced apart to provide about 6 openings per square cm (about 39 openings per square inch). The head loss for an opening 248 in the corner regions 240, 242, 244, 246 of the perforated plate is determined from Equation (I) above using a velocity of about 0.0005 m/s, dynamic viscosity of about 118.3 kg/ms, density of about 2500 kg m$^3$, friction factor (f) of about 1.32×10$^7$ and head loss coefficient (K) of about 3.81×10$^5$. The average head loss provided by the corner regions 240, 242, 244, 246 of the perforated plate 210 is about 0.009 m.

The peripheral region 228 also comprises side regions 250, 252 having openings 254 arranged in pattern #2, the dimensions of and spacing between each opening 254 and the average head loss having the values as those discussed above for pattern #2.

EXAMPLE 2

Figure 10:
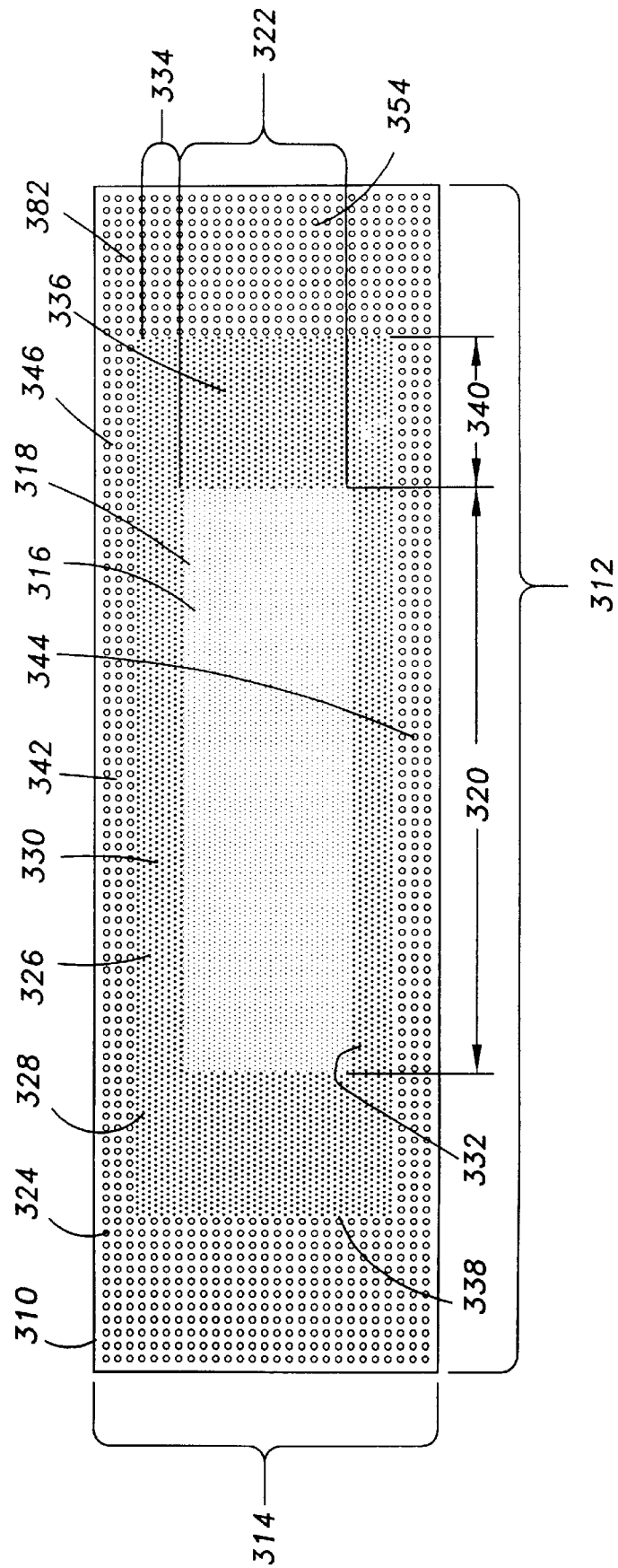
FIG. 10 is a top plan view of an alternative preferred embodiment of a perforated plate, according to the present invention.

Referring now to FIG. 10, there is shown a perforated plate 310 for use in a bushing according to the present invention having a tip plate configured to produce two forming packages of G-32 strand designation fibers. The designation G-32 means a fiber strand of about 812 filaments having an average filament diameter of about 10 micrometers and a tex of about 154 (about 3200 yards per pound). The perforated plate 310 was fabricated from the same platinum-rhodium alloy as that of Example 1. The length 312 of the perforated plate 310 is about 0.452 meters (about 17.80 inches), its width 314 is about 0.127 meters (about 5.00 inches) and its thickness is about 0.00046 meters. The lower surface of the perforated plate was positioned about 12 mm above the upper surface of the tip plate.

Figure 11:
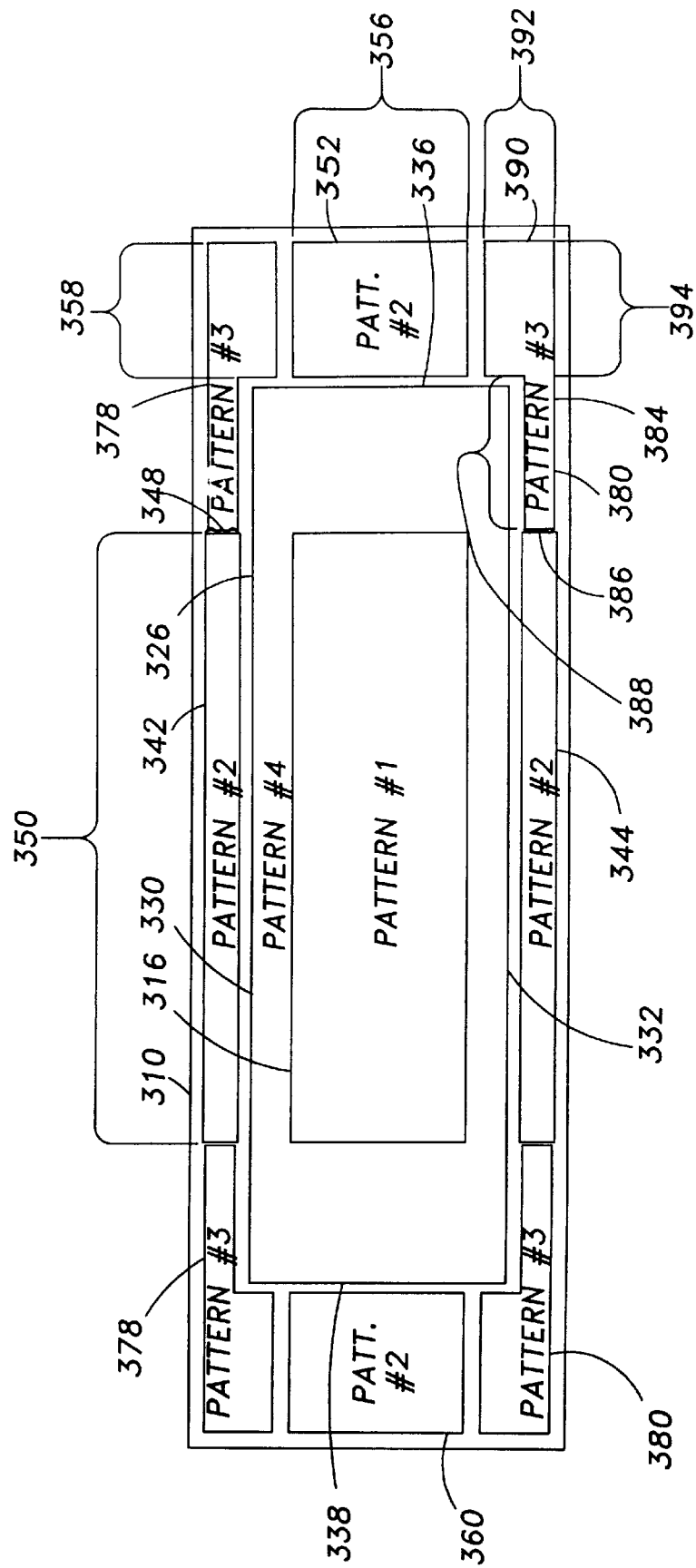
FIG. 11 is a diagram of the pattern of openings of the perforated plate of FIG. 10.

Perforated plate 310 comprises a central region 316 having a plurality of openings 318. The central region 316 is shown more clearly in FIG. 11, which is a schematic diagram showing the different opening patterns of perforated plate 310. The central region 316 is indicated as having pattern #1, in which each opening 318 has a diameter of about 1.4 mm (about 0.055 inches) and the openings 318 are spaced apart to provide about 15.5 openings per square cm (about 100 openings per square inch). The central region 316 comprises about 23 percent of the total surface area of the perforated plate 310.

The head loss for an opening 318 in the central region 316 of the perforated plate 310 is determined from Equation (I) above using a velocity of about 0.0017 m/s, dynamic viscosity of about 66.47 kg/ms, density of about 2500 kg/m$^3$, friction factor (f) of about 2.18×10$^6$ and head loss coefficient (K) of about 1.58×10⁵. The average head loss provided by the central region 316 of the perforated plate 310 was about 0.058 m.

Perforated plate 310 also comprises a peripheral region 324 which surrounds central region 316. The peripheral region 324 is divided into a plurality of subregions. Peripheral subregion 326 surrounds central region 316. The peripheral subregion 326 has openings 328 arranged in pattern #4, in which each opening 328 has a diameter of about 1.6 mm (about 0.063 inches) and the openings 328 are spaced apart to provide about 15.5 openings per square centimeter (cm) (about 100 openings per square inch).

The sides 330, 332 of peripheral subregion 326 have a width 334 of about 0.22 mm. The ends 336, 338 of peripheral subregion 326 have a width 340 of about 0.061 mm. The head loss for an opening 328 in the peripheral subregion 326 of the perforated plate 310 is determined from Equation (I) above using a velocity of about 0.0009 m/s, dynamic viscosity of about 118.28 kg/ms, density of about 2500 kg/m³, friction factor (f) of about 7.31×10⁶ and head loss coefficient (K) of about 5.29×10⁵. The average head loss provided by the peripheral subregion 326 of the perforated plate 310 is about 0.054 m.

Peripheral region 324 also includes opposed side regions 342, 344 located between the respective sides 330, 332 of peripheral subregion 326 and the side walls 44 of the bushing 18. The opposed side regions 342, 344 have openings 346 arranged in pattern #2, in which each opening 346 has a diameter of about 2.64 mm (about 0.104 inches) and the openings 346 are spaced apart to provide about 4 openings per square cm (about 25 openings per square inch). Each side region 342, 344 has a width 348 of about 15 mm and a length 350 of about 224 mm. The head loss for an opening 346 in the opposed side regions 342, 344 of the perforated plate 310 is determined from Equation (I) above using a velocity of about 0.0011 m/s, dynamic viscosity of about 100.53 kg/ms, density of about 2500 kg/m³, friction factor (f) of about 5.09×10⁶ and head loss coefficient (K) of about 1.54×10⁵. The average head loss provided by the opposed side regions 342, 344 of the perforated plate 310 was about 0.019 m.

Peripheral region 324 includes opposed end regions 352, 360 having openings 354 arranged in pattern #2. Each end region 352, 360 has a width 356 of about 61 mm and a length 358 of about 53 mm. The average head loss for an opening 354 in the end regions 352, 360 of the perforated plate 310 was about 0.019 m.

The peripheral region 324 also includes opposed corner regions 378, 380 between side regions 342, 344, peripheral subregion 326 and first end region 352. The corner regions 378, 380 have openings 382 arranged in pattern #3, in which each opening 382 has a diameter of about 3 mm (about 0.120 inches) and the openings 382 are spaced apart to provide about 4 openings per square cm (about 25 openings per square inch). The corner regions 378, 380 are generally "L"-shaped and have a first leg 384 having a width 386 of about 15 mm and a length 388 of about 56 mm and a second leg 390 having a width 392 of about 13 mm and a length 394 of about 53 mm. The head loss for an opening 382 in the corner regions 378, 380 of the perforated plate 310 is determined from Equation (I) above using a velocity of about 0.0006 m/s, dynamic viscosity of about 166.92 kg/ms, density of about 2500 kg/m³, friction factor (f) of about 1.55×10⁷ and head loss coefficient (K) of about 4.48×10⁵. The average head loss provided by the corner regions 378, 380 of the perforated plate 310 is about 0.015 m.

EXAMPLE 3

Figure 12:
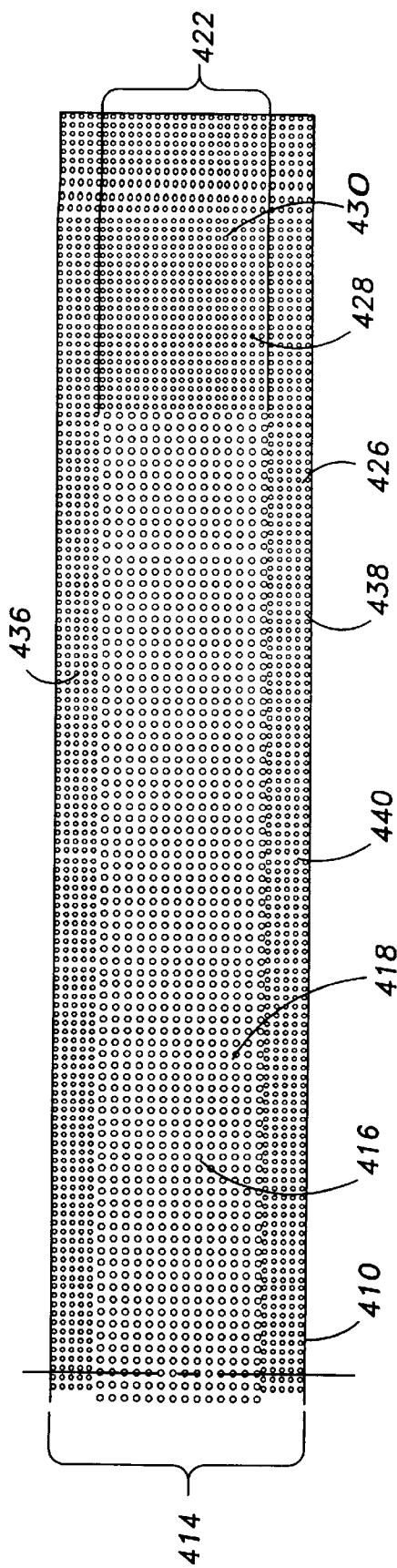
FIG. 12 is a top plan view of an alternative preferred embodiment of a portion of a perforated plate, according to the present invention.

Referring to FIG. 12, there is shown a portion of a perforated plate 410 for use in a bushing according to the present invention having a tip plate configured to produce one forming package of G-5 strand designation fibers. For purposes of clarity in the drawing, only one-half of the perforated plate 410 is shown. The designation G-5 means a fiber strand of about 5000 filaments having an average filament diameter of about 10 micrometers and a tex of about 990 (about 500 yards per pound). The perforated plate 410 was fabricated from the same type of platinum-rhodium alloy as that used to fabricate the perforated plate of Example 1. The total length of the perforated plate 410 is about 0.78 meters (about 30.74 inches), its width 414 is about 0.068 meters (about 2.691 inches) and its thickness is about 0.00046 meters. The lower surface of the perforated plate was positioned about 63.5 mm (about 2.5 inches) above the upper surface of the tip plate.

Figure 13:
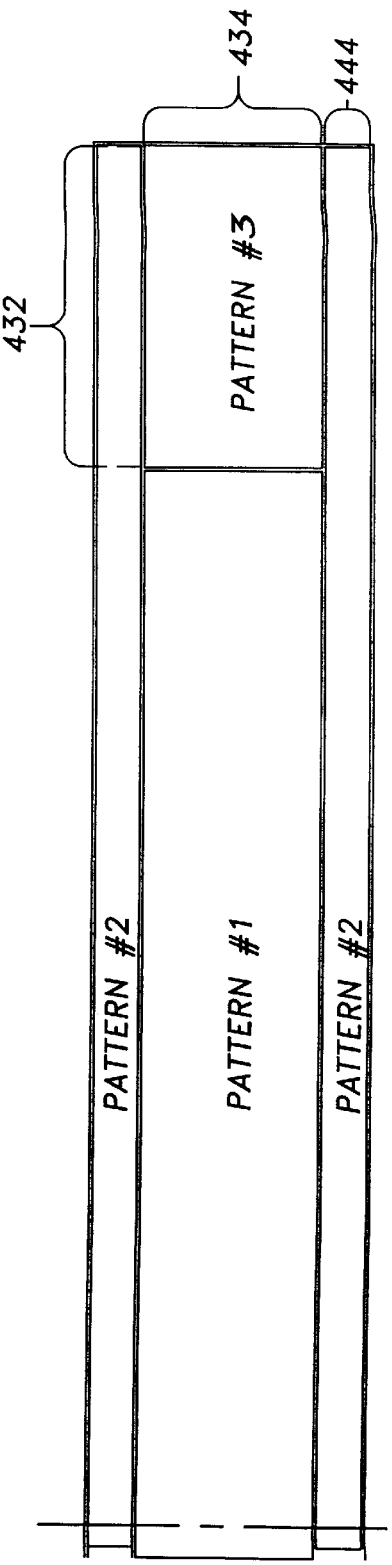
FIG. 13 is a diagram of the pattern of openings of the portion of the perforated plate of FIG. 12.

Perforated plate 410 comprises a central region 416 having a plurality of openings 418. The length of the central region 416 is about 0.60 meters and its width 422 is about 0.044 meters. The central region 416 comprises about 50 percent of the total surface area of the perforated plate 410. The central region 416 is shown more clearly in FIG. 13, which is a schematic diagram showing the different opening patterns of perforated plate 410. The central region 416 is indicated as having pattern #1, each opening 418 having a diameter of about 1.2 mm (about 0.048 inches) and the openings 418 being spaced apart to provide about 13 openings per square centimeter (cm) (about 81 openings per square inch). The head loss for an opening 418 in the central region 416 of the perforated plate 410 is determined from Equation (I) above using a velocity of about 0.0007 m/s, dynamic viscosity of about 108.92 kg/ms, density of about 2500 kg/m³, friction factor (f) of about 8.66×10⁶ and head loss coefficient (K) of about 7.25×10⁵. The average head loss provided by the central region 416 of the perforated plate 410 is about 0.050 m.

Perforated plate 410 also comprises a peripheral region 426 which surrounds central region 416. Peripheral region 426 is divided into a plurality of subregions, including an end region 428. The end region 428 has openings 430 arranged in pattern #3, each opening 430 having a diameter of about 1.2 mm (about 0.048 inches) and the openings 430 being spaced apart to provide about 27 openings per square cm (about 176 openings per square inch). The length 432 of the end region 428 is about 0.090 meters and the width 434 is about 0.044 meters. The head loss for an opening 430 in the end region 428 of the perforated plate 410 is determined from Equation (I) above using a velocity of about 0.0005 m/s, dynamic viscosity of about 142.66 kg/ms, density of about 2500 kg/m³, friction factor (f) of about 1.59×10⁷ and head loss coefficient (K) of about 1.33×10⁶. The average head loss provided by the end region 428 of the perforated plate 410 is about 0.047 m.

The peripheral region 426 comprises side regions 436, 438 having openings 440 arranged in pattern #2, in which each opening 440 has a diameter of about 1.2 mm (about 0.048 inches) and the openings 440 are spaced apart to provide about 33 openings per square cm (about 215 openings per square inch). The length of the side regions 436, 438 is about 0.77 meters and the width 444 is about 0.011 meters. The head loss for an opening 440 in the side regions 436, 438 of the perforated plate 410 is determined from Equation (I) above using a velocity of about 0.0004 m/s, dynamic viscosity of about 166.92 kg/ms, density of about 2500 kg/m³, friction factor (f) of about 2.32×10⁷ and head loss coefficient (K) of about 1.95×10⁶. The average head loss provided by the side regions 436, 438 of the perforated plate 410 is about 0.044 m.

EXAMPLE 4

Figure 14:
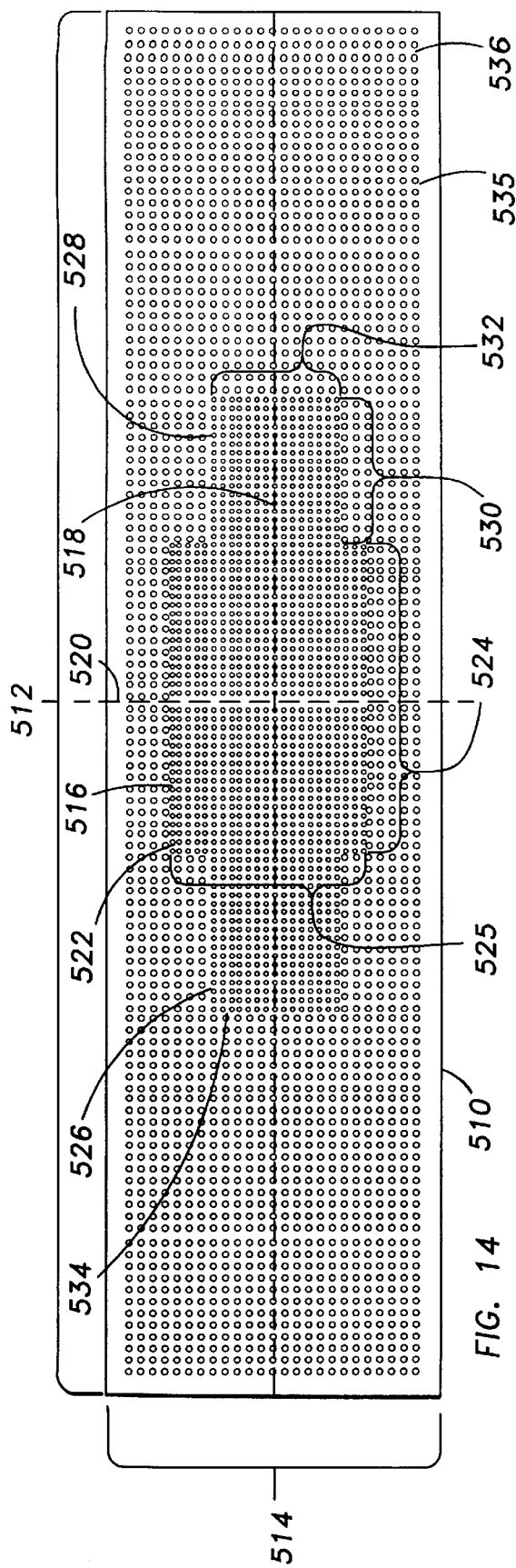
FIG. 14 is a top plan view of an alternative preferred embodiment of a perforated plate, according to the present invention.

Referring to FIG. 14, there is shown a perforated plate 510 for use in a bushing according to the present invention having a tip plate configured to produce one forming package of T-0.9 strand designation fibers. As is well known to those skilled in the art, the designation T-0.9 means a fiber strand of about 4400 filaments having an average filament diameter of about 23.52 micrometers and a tex of about 5500 (about 90 yards per pound). The perforated plate 510 was fabricated from the same type of platinum alloy as that used to prepare the perforated plate of Example 1. The length 512 of the perforated plate 510 is about 0.67 meters (about 26.5 inches), its width 514 is about 0.16 meters (about 6.22 inches) and its thickness is about 0.00046 meters. The lower surface of the perforated plate was positioned about 12 mm above the upper surface of the tip plate.

Perforated plate 510 comprises a central region 516 which is symmetrical about longitudinal axis 518 and an axis 520 which bisects the width of the perforated plate 510. The central region 516 has a first portion 522 having a length 524 of about 0.168 meters and a width 525 of about 0.089 meters. The central region 516 has a pair of opposed end portions 526, 528 on either side of the first portion 522 along the longitudinal axis 518. Each end portion 526, 528 has a length 530 of about 0.076 meters and a width 532 of about 0.058 meters. The central region 516 comprises about 22 percent of the total surface area of the perforated plate 510.

Figure 15:
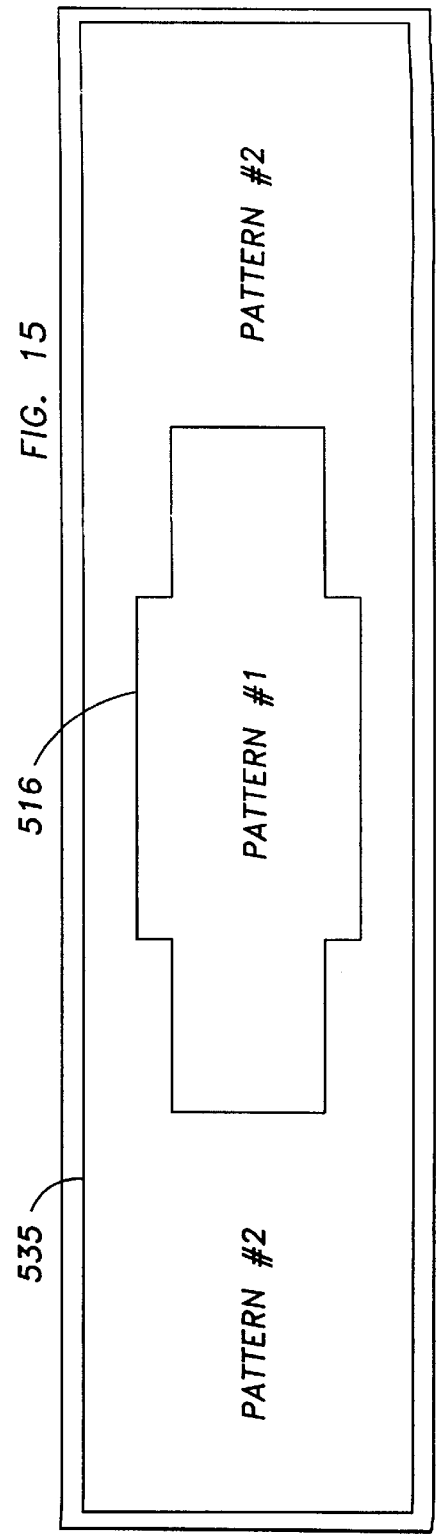
FIG. 15 is a diagram of the pattern of openings of the perforated plate of FIG. 14.

The central region 516 is shown more clearly in FIG. 15, which is a schematic diagram showing the different opening patterns of perforated plate 510. The central region 516 is indicated as having pattern #1, in which each opening 534 has a diameter of about 1.4 mm (about 0.0.055 inches) and the openings 226 are spaced apart to provide about 16 openings per square cm (about 100 openings per square inch). The head loss for an opening 534 in the central region 516 of the perforated plate 510 is determined from Equation (I) above using a velocity of about 0.0013 m/s, dynamic viscosity of about 86.37 kg/ms, density of about 2500 kg/m³, friction factor (f) of about 3.70×10⁶ and head loss coefficient (K) of about 2.67×10⁵. The average head loss provided by the central region 516 of the perforated plate 510 is about 0.057 m.

Perforated plate 510 also comprises a peripheral region 535 which surrounds central region 516. Peripheral region 534 has openings 536 arranged in pattern #2, each opening 536 having a diameter of about 3.8 mm (about 0.12 inches) and the openings 536 are spaced apart to provide about 4 openings per square cm (about 25 openings per square inch). The head loss for an opening 536 in the peripheral region 535 of the perforated plate 510 is determined from Equation (I) above using a velocity of about 0.0008 m/s, dynamic viscosity of about 198.97 kg/ms, density of about 2500 kg/m³, friction factor (f) of about 1.38×10⁷ and head loss coefficient (K) of about 4.00×10⁵.The average head loss provided by the peripheral region 535 of the perforated plate 510 is about 0.023 m.

From the foregoing description, it can be seen that the present invention provides a bushing, assembly and methods which promote reduce temperature variation within the molten fiberizable material in the bushing, thereby increasing filament diameter uniformity and reducing fiber breakage during attenuation by increasing flow and passive mixing at the periphery of the bushing reservoir and decreasing accumulation of devitrified material in these areas. The perforated plate of the present invention provides an additional heat source for thermally conditioning the molten material contained within the bushing, screens refractory materials and batch particulates from the molten material and may shield the bushing tip plate from radiant heat emanating from the forehearth combustion apparatus.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

Therefore, we claim:

1. A bushing for forming fibers from a molten fiberizable material, the bushing comprising:

(a) a generally planar tip plate having an orifice region including a plurality of orifices to permit flow of a molten fiberizable material therethrough;

(b) a side wall extending generally upwardly from a periphery of the tip plate to form a reservoir for supplying molten fiberizable material to the plurality of orifices of the tip plate; and (c) a substantially flat perforated plate of generally uniform thickness positioned within the reservoir generally parallel to, closely spaced apart from and substantially coextensive with the orifice region of the tip plate, the perforated plate comprising a central region and a peripheral region surrounding the central region, each of the central region and the peripheral region of the perforated plate having a plurality of openings to permit flow of molten fiberizable material therethrough, said plurality of openings configured and positioned so that the average head loss of hotter molten material flowing through the central region of the perforated plate is greater than average head loss of cooler molten material flowing through the peripheral region of the perforated plate so as to promote mixing of the molten material at the peripheral region above the perforated plate prior to the molten material flowing through the perforated plate.

2. The bushing according to claim 1, wherein the perforated plate has an average overall surface area which is between about 75 percent and 100 percent of an average overall surface area of the orifice region of the tip plate.

3. The bushing according to claim 1, wherein the perforated plate is fully coextensive with the orifice region of the tip plate.

4. The bushing according to claim 1, wherein the perforated plate is fully coextensive with the entire tip plate.

5. The bushing according to claim 1, wherein an outside edge of the perforated plate is connected to a portion of the side wall.

6. The bushing according to claim 5, wherein the bushing includes a pair of opposed side walls and a pair of opposed end walls which are connected to form the reservoir, the perforated plate including a first pair of opposed edges and a second pair of opposed edges, each of the edges of the perforated plate being connected to a corresponding wall selected from the group consisting of the opposed side walls and the opposed end walls.

7. The bushing according to claim 1, wherein the perforated plate has a greater number of openings in the peripheral region than in the central region.

8. The bushing according to claim 1, wherein within the central region at least one opening of the plurality of openings has a diameter which is greater than a diameter of another opening of the plurality of openings.

9. The bushing according to claim 1, wherein the central region of the perforated plate includes a plurality of subregions.

10. The bushing according to claim 1, wherein within the peripheral region at least one opening of the plurality of openings has a diameter which is greater than a diameter of another opening of the plurality of openings.

11. The bushing according to claim 1, wherein at least one opening of the plurality of openings in the peripheral region of the perforated plate has a diameter which is greater than a diameter of an opening of the plurality of openings in the central region of the perforated plate.

12. The bushing according to claim 1, wherein the peripheral region of the perforated plate has a larger total area for flow through the plurality of openings than the total area for flow through the plurality of openings in the central region.

13. The bushing according to claim 1, wherein the peripheral region of the perforated plate includes a plurality of subregions.

14. The bushing according to claim 1, wherein the bushing includes a pair of opposed side walls and a pair of opposed end walls which are connected to form the reservoir, the peripheral region of the perforated plate including opposed side regions adjacent to corresponding opposed side walls of the bushing and opposed end regions adjacent to corresponding end regions of the bushing, wherein head loss of molten material flowing through the side regions of the perforated plate is greater than head loss of molten material flowing through the end regions of the perforated plate.

15. The bushing according to claim 1, wherein the average head loss of molten material flowing through the central region of the perforated plate ranges from about 0.0025 to about 0.15 meters.

16. The bushing according to claim 1, wherein the average head loss of molten material flowing through the peripheral region of the perforated plate ranges from 0 to about 0.1 meters.

17. The bushing as in claim 1 wherein the openings in the flat perforated plate are tapered.

18. The bushing as in claim 1 wherein the flat perforated plate is spaced from the tip plate a distance between about 5 to about 75 mm.

19. The bushing as in claim 18 wherein the flat perforated plate is spaced from the tip plate a distance between about 10 to about 15 mm.

20. A bushing for forming fibers from a molten fiberizable material, the bushing comprising:
(a) a generally planar tip plate comprising a central region and a peripheral region surrounding the central region, each of the central region and the peripheral region having a plurality of orifices to permit flow of a molten fiberizable material therethrough;
(b) a side wall extending generally upwardly from a periphery of the tip plate to form a reservoir for supplying molten fiberizable material to the plurality of orifices of the tip plate, the reservoir having a central region and a peripheral region surrounding the central region; and
(c) a generally flat perforated plate of generally uniform thickness positioned within the central region of the reservoir generally parallel to, closely spaced apart from and substantially coextensive with the central region of the tip plate, the perforated plate having a plurality of openings positioned within the central region of the reservoir to permit flow of molten fiberizable material therethrough, said plurality of openings configured and positioned so that the average head loss of hotter molten material flowing through the central region of the reservoir is greater than average head loss of cooler molten material flowing through the peripheral region of the reservoir so as to promote mixing of the molten material at the peripheral region of the reservoir above the perforated plate prior to the molten material flowing through the perforated plate.

21. A bushing for forming fibers from a molten fiberizable material, the bushing comprising:
(a) a generally planar tip plate having an orifice region including a plurality of orifices to permit flow of a molten fiberizable material therethrough;
(b) a side wall extending generally upwardly from a periphery of the tip plate to form a reservoir for supplying molten fiberizable material to the plurality of orifices of the tip plate; and
(c) a substantially flat perforated plate of generally uniform thickness positioned within the reservoir generally parallel to, closely spaced apart from and substantially coextensive with the orifice region of the tip plate, the perforated plate comprising a central region and a peripheral region surrounding the central region, each of the central region and the peripheral region of the perforated plate having a plurality of openings to permit flow of molten fiberizable material therethrough, said plurality of openings configured and positioned so that the average pressure drop of hotter molten material flowing through the central region of the perforated plate is greater than average pressure drop of cooler molten material flowing through the peripheral region of the perforated plate so as to promote mixing of the molten material at the peripheral region above the perforated plate prior to the molten material flowing through the perforated plate.

22. A fiber forming assembly comprising:
(a) a supply of molten fiberizable material; and
(b) a bushing comprising:
(1) a generally planar tip plate having a plurality of orifices to permit flow of the molten fiberizable material therethrough;
(2) a side wall extending generally upwardly from a periphery of the tip plate to form a reservoir for supplying the molten fiberizable material to the plurality of orifices of the tip plate; and
(3) a substantially flat perforated plate of generally uniform thickness positioned within the reservoir generally parallel to, closely spaced apart from and substantially coextensive with the tip plate, the perforated plate comprising a central region and a peripheral region surrounding the central region, each of the central region and the peripheral region of the perforated plate having a plurality of openings to permit flow of the molten fiberizable material therethrough, said plurality of openings configured and positioned so that the average head loss of hotter molten material flowing through the central region of the perforated plate is greater than average head loss of cooler molten material flowing through the peripheral region of the perforated plate so as to promote mixing of the molten material at the peripheral region above the perforated plate prior to the molten material flowing through the perforated plate.

23. A fiber forming assembly comprising:
(a) a supply of molten fiberizable material; and
(b) a bushing comprising:
  (1) a generally planar tip plate comprising a central region and a peripheral region surrounding the central region, each of the central region and the peripheral region having a plurality of orifices to permit flow of a molten fiberizable material therethrough;
  (2) a side wall extending generally upwardly from a periphery of the tip plate to form a reservoir for supplying the molten fiberizable material to the plurality of orifices of the tip plate, the reservoir having a central region and a peripheral region surrounding the central region; and
  (3) a generally flat perforated plate of generally uniform thickness positioned within the central region of the reservoir generally parallel to, closely spaced apart from and substantially coextensive with the central region of the tip plate, the perforated plate having a plurality of openings positioned within the central region of the reservoir to permit flow of the molten fiberizable material therethrough, said plurality of openings configured and positioned so that the average head loss of hotter molten material flowing through the central region of the reservoir is greater than average head loss of cooler molten material flowing through the peripheral region of the reservoir so as to promote mixing of the molten material at the peripheral region of the reservoir above the perforated plate prior to the molten material flowing through the perforated plate.

24. A bushing for forming fibers from a molten fiberizable material, the bushing comprising:
(a) a generally planar tip plate having an orifice region including a plurality of orifices to permit flow of a molten fiberizable material therethrough;
(b) a side wall extending generally upwardly from a periphery of the tip plate to form a reservoir for supplying molten fiberizable material to the plurality of orifices of the tip plate; and
(c) a substantially flat perforated plate of generally uniform thickness positioned within the reservoir generally parallel to, closely spaced apart from and substantially coextensive with the orifice region of the tip plate, the perforated plate comprising a central region and a peripheral region surrounding the central region, each of the central region and the peripheral region of the perforated plate having a plurality of openings to permit flow of molten fiberizable material therethrough, wherein the openings in the central and peripheral regions are configured and positioned such that the resistance to the flow of hotter molten material through the central region of the perforated plate is greater than the resistance to the flow of cooler molten material through the peripheral region of the perforated plate so as to promote passive mixing of the molten material in the reservoir proximate the side wall.

* * * * *